United States Patent
Ertel et al.

(10) Patent No.: US 12,215,995 B2
(45) Date of Patent: Feb. 4, 2025

(54) INGREDIENT DISPENSERS

(71) Applicant: Jened LLC, Washington, DC (US)

(72) Inventors: Edward Ertel, Washington, DC (US);
Yen Wei Lee, Boston, MA (US);
Zachary Carlins, Boston, MA (US);
Brendan Crawford, Boston, MA (US);
James Shepard, Boston, MA (US)

(73) Assignee: Jened LLC, Washington, DC (US)

( * ) Notice: Subject to any disclaimer, the term of this patent is extended or adjusted under 35 U.S.C. 154(b) by 0 days.

(21) Appl. No.: 18/776,103

(22) Filed: Jul. 17, 2024

(65) Prior Publication Data

US 2024/0369392 A1    Nov. 7, 2024

Related U.S. Application Data

(62) Division of application No. 18/630,469, filed on Apr. 9, 2024.

(60) Provisional application No. 63/594,371, filed on Oct. 30, 2023, provisional application No. 63/461,688, filed on Apr. 25, 2023.

(51) Int. Cl.
*G01F 11/34* (2006.01)
*G01F 11/26* (2006.01)
*G01F 11/32* (2006.01)

(52) U.S. Cl.
CPC ............ *G01F 11/34* (2013.01); *G01F 11/263* (2013.01); *G01F 11/32* (2013.01)

(58) Field of Classification Search
CPC .................................................. G01F 11/30–34
See application file for complete search history.

(56) References Cited

U.S. PATENT DOCUMENTS

| | | | |
|---|---|---|---|
| 1,752,527 A | 4/1930 | Howard | |
| 2,161,060 A | * 6/1939 | Kelsey | ............ B67D 7/74 |
| | | | 137/574 |
| 2,175,933 A | 10/1939 | Walrod | |
| 2,339,644 A | 1/1944 | Lucas | |

(Continued)

FOREIGN PATENT DOCUMENTS

| | | |
|---|---|---|
| CN | 203388638 U | 1/2014 |
| DE | 20312737 U1 | 10/2003 |

(Continued)

OTHER PUBLICATIONS

Invitation to Pay Additional Fees, mailed Jun. 17, 2024 for International Application No. PCT/US2024/023682.

(Continued)

*Primary Examiner* — Paul R Durand
*Assistant Examiner* — Randall A Gruby
(74) *Attorney, Agent, or Firm* — Wolf, Greenfield & Sacks, P.C.

(57) ABSTRACT

Ingredient dispensers for use in dispensing a measured amount of dry and/or liquid ingredient for a user are disclosed. In some embodiments, a dry ingredient dispenser is provided and may include a receptacle configured to contain a select amount of dry ingredient and a cap comprising an actuating portion and a measuring chamber portion. In some embodiments, a liquid ingredient dispenser is provided and may include a receptacle configured to contain a select amount of liquid ingredient and a dispensing portion which may be rotatable to dispense a measured amount of liquid ingredient for the user.

6 Claims, 34 Drawing Sheets

(56) References Cited

U.S. PATENT DOCUMENTS

| | | |
|---|---|---|
| 2,387,922 A | 10/1945 | McBrien |
| 2,540,259 A | 2/1951 | Haugen |
| 2,659,518 A | 11/1953 | Donnelly |
| 2,806,639 A | 9/1957 | Halverson |
| 2,873,050 A | 2/1959 | Halverson |
| 2,974,834 A | 3/1961 | Foote et al. |
| 2,985,343 A | 5/1961 | Mask |
| 3,134,521 A * | 5/1964 | Van Maasdam ...... G01F 11/263 222/443 |
| 3,204,833 A | 9/1965 | Weitzner |
| 3,232,496 A | 2/1966 | Rockwell et al. |
| 3,277,931 A * | 10/1966 | Emrick .................. B67D 7/74 137/264 |
| 3,467,151 A | 9/1969 | Vogt |
| 3,945,534 A | 3/1976 | Ady |
| 4,023,602 A | 5/1977 | Sparr, Sr. |
| 4,258,865 A | 3/1981 | Vahl et al. |
| 4,856,681 A | 8/1989 | Murray |
| 4,951,839 A | 8/1990 | Kong |
| 5,044,527 A | 9/1991 | Hickerson |
| 5,182,948 A | 2/1993 | Robbins et al. |
| 5,386,929 A | 2/1995 | Dutt et al. |
| 5,437,394 A | 8/1995 | Ruck |
| 5,588,563 A | 12/1996 | Liu |
| 5,909,824 A | 6/1999 | Qian et al. |
| 5,944,230 A | 8/1999 | Chiang |
| 6,003,738 A | 12/1999 | Foster et al. |
| 6,024,252 A | 2/2000 | Clyde |
| 6,125,699 A | 10/2000 | Molenaar |
| 6,550,640 B2 | 4/2003 | Smith |
| 6,601,734 B1 | 8/2003 | Smith |
| 6,776,315 B1 | 8/2004 | Laulom et al. |
| 6,796,343 B2 | 9/2004 | Kelsey et al. |
| 7,097,071 B2 | 8/2006 | Anderson et al. |
| 7,665,630 B2 | 2/2010 | McGill |
| 7,850,027 B2 | 12/2010 | Hayes et al. |
| 8,336,377 B2 | 12/2012 | Robbins |
| 8,439,231 B2 | 5/2013 | Schroedter |
| 8,757,451 B2 | 6/2014 | Schroedter |
| 9,068,874 B2 | 6/2015 | Debski |
| 9,131,665 B2 | 9/2015 | Mackelvie |
| 9,423,285 B2 | 8/2016 | Barton |
| 9,464,928 B2 | 10/2016 | Debski |
| 9,523,596 B2 | 12/2016 | Skillin et al. |
| 9,527,650 B2 * | 12/2016 | Jordan .................. B65D 25/56 |
| 9,567,137 B2 | 2/2017 | Peng |
| 10,512,366 B1 | 12/2019 | Kadoch |
| 11,052,415 B2 | 7/2021 | Thomas et al. |
| 2003/0127469 A1 | 7/2003 | Terry |
| 2005/0092641 A1 | 5/2005 | Marsden et al. |
| 2008/0134780 A1 | 6/2008 | Micheli |
| 2008/0230566 A1 | 9/2008 | Frutin |
| 2009/0056440 A1 | 3/2009 | Vendl et al. |
| 2010/0255975 A1 | 10/2010 | Mauchle et al. |
| 2015/0014349 A1 | 1/2015 | Rau |
| 2015/0297463 A1 | 10/2015 | Barton |
| 2016/0116321 A1 | 4/2016 | Lacasse et al. |
| 2018/0238727 A1 | 8/2018 | Wong |
| 2018/0296011 A1 | 10/2018 | Valles |
| 2019/0077555 A1 | 3/2019 | Paisley |
| 2019/0329276 A1 | 10/2019 | Simard |
| 2020/0141779 A1 | 5/2020 | Jangsäter et al. |
| 2022/0087478 A1 | 3/2022 | Moens et al. |
| 2022/0111991 A1 | 4/2022 | Wilson |
| 2022/0205825 A1 | 6/2022 | Francavilla |
| 2022/0388829 A1 | 12/2022 | Beavis et al. |

FOREIGN PATENT DOCUMENTS

| | | |
|---|---|---|
| EP | 2742830 A2 | 6/2014 |
| EP | 2499988 B1 | 3/2019 |
| GB | 1046136 A | 10/1966 |
| GB | 2150117 A | 6/1985 |

OTHER PUBLICATIONS

International Search Report and Written Opinion, mailed Aug. 26, 2024 for International Application No. PCT/US2024/023682.

* cited by examiner

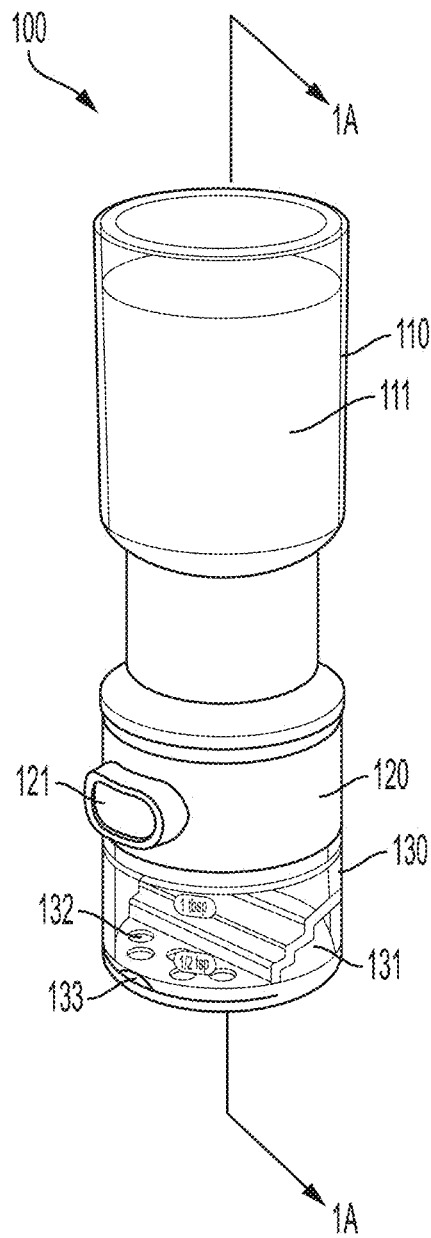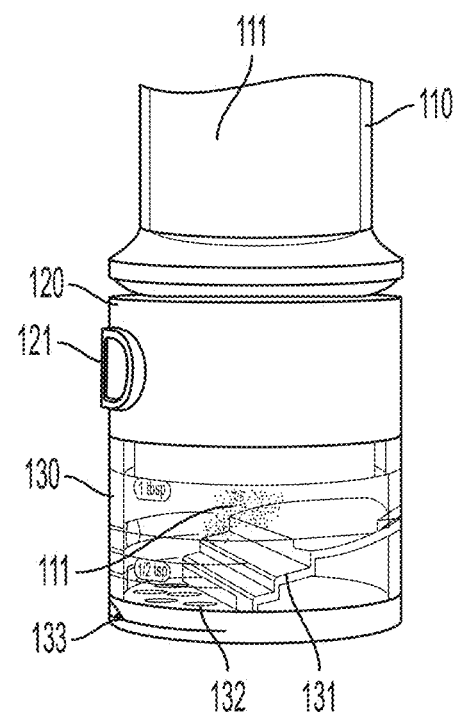
FIG. 1A
FIG. 1B

INGREDIENT DISPENSERS

RELATED APPLICATIONS

This application is a divisional of U.S. patent application Ser. No. 18/630,469, filed Apr. 9, 2024, which claims priority under 35 U.S.C. § 119 (e) to U.S. Provisional Application No. 63/461,688, filed Apr. 25, 2023, and U.S. Provisional Application No. 63/594,371, filed Oct. 30, 2023, the content of which is incorporated by reference in its entirety for all purposes.

FIELD

Disclosed embodiments are related to ingredient dispensers for use in dispensing dry or liquid ingredients.

BACKGROUND

Various types of ingredient dispensers have been employed for use in containing select amounts of dry or liquid ingredients that may then be dispensed for use by a user to enhance meals or meal prep. Such ingredient dispensers typically include a receptacle to store the dry or liquid ingredients as well as an outlet to permit dispensing of said ingredients.

SUMMARY

In one embodiment, a dry ingredient dispenser for dispensing a measured amount of dry ingredient is provided. The dry ingredient dispenser may include a receptacle configured to contain the dry ingredient, an actuating portion engageable with the receptacle, and a measuring chamber engageable with the actuating portion. The actuating portion may comprise a valve and an actuator. The measuring chamber may include one or more measurement indicators configured to indicate a measurement volume. In some embodiments, actuation of the actuator may provide an opening in the valve to allow dry ingredient to be dispensed from the receptacle into the measuring chamber and the measuring chamber may be configured to accumulate the dispensed dry ingredient.

In another embodiment, a dry ingredient dispenser for dispensing a measured amount of dry ingredient is provided. The dry ingredient dispenser may include a receptacle configured to contain the dry ingredient, an actuating portion engageable with the receptacle, and a measuring chamber engageable with the actuating portion. The actuating portion may comprise a funnel and a valve. In some embodiments, the funnel may be configured to accumulate at least a portion of the dry ingredient from the receptacle, and the funnel may be insertable into the valve to dispense the accumulated dry ingredient into the measuring chamber.

In another embodiment, a dry ingredient dispenser for dispensing a measured amount of dry ingredient is provided. The dry ingredient dispenser may include a receptacle configured to contain the dry ingredient, an actuating portion engageable with the receptacle, and a measuring chamber engageable with the actuating portion. The actuating portion may comprise a grinding mechanism. The measuring chamber may include one or more measurement indicators configured to indicate a measurement volume. In some embodiments, the actuating portion may be rotatable such that rotation of the actuating portion actuates the grinder mechanism and the grinder mechanism may be configured to grind the whole dry ingredient into ground dry ingredient. In some embodiments, the measuring chamber may be configured to accumulate the ground dry ingredients.

In another embodiment, a liquid ingredient dispenser for dispensing a measured amount of liquid ingredient is provided. The liquid ingredient dispenser may include a receptacle configured to contain liquid ingredient, a rotatable collar engageable with the receptacle, and a dispenser head engageable with the rotatable collar. The rotatable collar may include a plurality of recesses formed thereon, and each recess of the plurality of recesses may have a depth associated with a measured volume. The dispenser head may include a trigger. In some embodiments, the dispenser head may also include a dispenser nozzle that is in fluid communication with the receptacle, and at least a portion of the trigger may be interfaceable with at least one recess of the plurality of recesses such that a distance traveled by the trigger during actuation of the trigger corresponds to an amount of the measured volume of the liquid ingredient dispensed from the dispenser nozzle.

In another embodiment, a liquid ingredient dispenser for dispensing a measured amount of liquid ingredient is provided. The liquid ingredient dispenser may include a receptacle configured to contain liquid ingredient, an actuating portion engageable with the receptacle, and a measuring chamber engageable with the actuating portion. The actuating portion may include a trigger configured to supply liquid ingredient from the receptacle. The measuring chamber may include a plurality of compartments each having a different measurement volume. In some embodiments, the measuring chamber is rotatable to align at least one compartment of the plurality of compartments with an outlet that is in fluid communication with the receptacle such that at least one compartment is configured to receive liquid ingredient supplied from the receptacle.

In another embodiment, a liquid ingredient dispenser for dispensing a measured amount of liquid ingredient is provided. The liquid ingredient dispenser may include a receptacle configured to contain liquid ingredient. The dispenser may also include a button configured to actuate a plunger between an open position and a closed position. In some embodiments, in the open position the plunger is configured to permit flow of the liquid ingredient from the receptacle while in the closed position the plunger is configured to prevent flow of liquid ingredient from the receptacle. The dispenser may also include a measuring chamber having a sloped surface configured to receive flow of the liquid ingredient from the receptacle.

In another embodiment, a liquid ingredient dispenser for dispensing a measured amount of liquid ingredient is provided. The liquid ingredient dispenser may include a measuring chamber configured to receive a flow of liquid ingredient from a receptacle via an intake. The dispenser may also include a trigger configured to actuate a plunger between an actuated state and a non-actuated state. In the actuated state, the plunger may be configured to dispense an amount of the liquid ingredient from the measuring chamber. The dispenser may also include a volume adjustment component configured to limit the amount of liquid ingredient dispensed from the measuring chamber by limiting a travel path distance of the plunger.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 1A is a perspective view of a dry ingredient dispenser according to one embodiment;

FIG. 1B is a perspective view of a distal region of the dry ingredient dispenser of FIG. 1A;

DETAILED DESCRIPTION

Figure 1C:
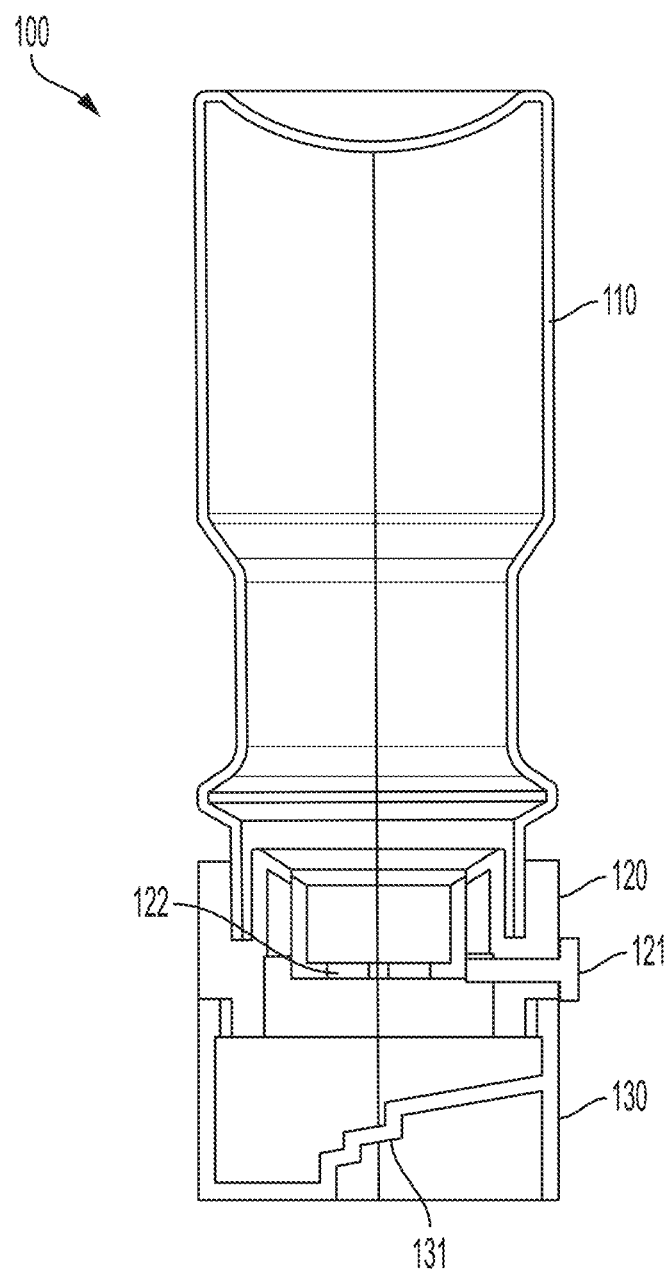
FIG. 1C is a cross-sectional schematic view of the dry ingredient dispenser of FIG. 1A taken along line 1A-1A of FIG. 1A.

Ingredient dispensers are commonly used to dispense dry or liquid ingredients for applications such as cooking and adjusting the level of desired taste preference in a plated dish. However, traditional ingredient dispensers have disadvantages, including that the amount of ingredient cannot be easily measured as it is dispensed. This may cause an excess of ingredient or a lack of ingredient to be inadvertently dispensed for the user. While measuring devices such as measuring spoons and measuring cups are able to provide the ability to measure a select amount of ingredient, these measuring devices are not integrated with receptacles that contain dry or liquid ingredients, and therefore must be employed separately from the ingredient dispensers to measure select amounts of ingredient.

In view of the above, the inventors have recognized that there is a need for ingredient dispensers which dispense measured amounts of dry or liquid ingredients to the user, as will be appreciated by the various embodiments disclosed herein.

Some aspects disclosed herein relate to dry ingredient dispensers which dispense measured amounts of dry ingredient for a user. In some embodiments, a dry ingredient dispenser includes a receptacle to contain the dry ingredients, and a cap for dispensing from the receptacle and measuring the dry ingredients. In some such embodiments, the cap may include an actuating portion for dispensing the dry ingredient from the receptacle and a measuring chamber portion for measuring the dispensed amount of dry ingredient. Of course, the cap may include a lid to allow the measured ingredient to be removed from the measuring chamber.

In some embodiments, the receptacle of the dry ingredient dispenser may be of any suitable size, shape, or other characteristics as the disclosure is not so limited. The receptacle may be constructed and arranged such that an opening of the receptacle is configured to be received by a corresponding cap, as discussed in greater detail below. Accordingly, the receptacle may have engagement features located at the opening that permit the receptacle to engage with corresponding engagement features on the cap. For example, the receptacle opening and the interior of the cap may both include screw threads such that the cap may be rotated onto and held to the opening end of the receptacle.

The receptacle may also be constructed of any suitable material including, but not limited to plastics (e.g., polyethylene terephthalate (PET), polyvinyl chloride (PVC), polypropylene (PP), high density polyethylene (HDPE)), glass, metals, or any other suitable material. In some embodiments, the receptacle may by clear or at least partially transparent to permit a user to see the amount of dry ingredient contained with the receptacle.

In some embodiments, the cap of the dry ingredient dispenser may be provided to the end user independently from a corresponding receptacle. In some such embodiments, the cap of the ingredient dispenser may be constructed and arranged to be engageable with a variety of commercially available preexisting ingredient receptacles having varied opening sizes. Accordingly, the user may remove the preexisting cap of a preexisting commercially available ingredient dispenser (e.g., a spice bottle, such as one marketed by the McCormick® company of Hunt Valley, Cockeysville, MD, USA) such that an opening of the preexisting receptacle is exposed, and then engage the cap of the various embodiments disclosed herein onto the preexisting receptacle.

While the cap of the various embodiments disclosed herein may be supplied independently from a receptacle as noted above, in some embodiments, the cap of the dry ingredient dispenser may instead be provided to the end user in conjunction with a receptacle. By providing the dry ingredient dispenser cap with a corresponding receptacle directly to the user, greater flexibility in size and/or shape of the receptacle and/or cap may be realized in contrast to employing a cap as disclosed herein with commercially available dry ingredient dispensers.

In some embodiments, the cap may be engageable to the receptacle via a variety of suitable engagement features including, but not limited to threaded features, an interference fit, or any other suitable fit as the disclosure is not limited.

As noted above, the dry ingredient dispenser cap of the proposed invention may include an actuating portion and a measuring chamber portion. The actuating portion may include an actuator (e.g., including a depressible button) to permit dispensing of the dry ingredient from the receptacle into the cap when actuated while also ensuring that the dry ingredient is contained within the receptacle when unactuated. The measuring chamber portion may be configured to receive the select amount of dry ingredient dispensed from the receptacle through the actuating portion.

In some embodiments, the actuating portion may include any suitable actuator to permit dispensing of the dry ingredient. In some such embodiments, the actuator may be a button, a lever, a trigger, or any other suitable actuator that permits an opening between the receptacle and the measuring chamber. For example, a button may be used, and depression of the button may cause a region or barrier between the receptacle and the measuring chamber to be opened to allow dry ingredient to dispense into the cap. While such an example is briefly described here, various embodiments of the actuating portion will be described in greater detail below.

In some embodiments, the measuring chamber may be of any suitable size, shape, or other characteristic to allow a user to measure an amount of dry ingredient, as the disclosure is not so limited. For example, the measuring chamber may have any suitable shape including, but not limited to cylindrical, hemispherical, a rectangular prism, an ellipsoidal prism, conical, or any other suitable shape, as the disclosure is not so limited.

In some embodiments, the measuring chamber may be integrally formed with the actuating portion of the cap. In some such embodiments, the measuring chamber may include a flip lid to dispense the select amount of dry ingredient that has accumulated in the cap for use in cooking or other suitable applications. In other embodiments, however, the measuring chamber may be removable from the actuating portion of the cap, thus permitting the measuring chamber itself to act as a separate ingredient receptacle to permit dispensing of the dry ingredient in the measured amount. In some such embodiments, the measuring chamber may be engageable to the actuating portion of the cap via a variety of suitable engagement features including, but not limited to threaded features, an interference fit, or any other suitable engagement features as the disclosure is not limited. For example, the actuating portion and the measuring chamber may each have threads, and the measuring chamber may be unthreaded from the actuating portion for use in dispensing the measured amount of dry ingredient.

In some embodiments, the capacity of the measuring chamber may be selectively adjusted for a given dry ingredient dispenser. In some such embodiments, the measuring chamber capacity may be adjusted by providing the measuring chamber with features such as telescoping features (e.g., where the measuring chamber includes two or more portions extendable relative to one another). The measuring chamber may also be extended at a greater distance to the actuating portion by rotating the measuring chamber relative to the actuating portion (e.g., via threaded features), thus increasing the measuring chamber capacity. While these adjustment features are disclosed, any other suitable arrangement may be used to adjust the capacity of the measuring chamber as the disclosure is not so limited. Accordingly, the measuring chamber capacity may be adjusted to provide a variety of different measurement volumes including, but not limited to greater than or equal to ⅛ teaspoon (tsp), ¼ tsp, ½ tsp, 1 tsp, ½ tablespoon (tbsp), ⅔ tbsp, 1 tbsp, 2 tbsp, 4 tbsp, or greater. While these measurement amounts are disclosed, measurement amounts which are greater or lesser are also contemplated.

In addition, in some embodiments, the measuring chamber of the dry ingredient dispenser may include markings to allow a user to identify the amount of a dry ingredient that has been dispensed into the measuring chamber. For example, the measuring chamber may include markings indicating different measurement amounts such as ⅛ teaspoon (tsp), ¼ tsp, ½ tsp, 1 tsp, ½ tablespoon (tbsp), ⅔ tbsp, 1 tbsp, 2 tbsp, 4 tbsp, or greater. While these measurement amounts are disclosed, any suitable measurement amount may be indicated on the measuring chamber depending on the volume of the measuring chamber provided for a given ingredient dispenser. The markings may be placed at any desired orientation and/or location on the measuring chamber or may be placed at a location and/or orientation at least partially dependent on the size and/or shape of the measuring chamber.

According to one aspect, a dry ingredient dispenser is provided which may include a receptacle to contain dry ingredient, and a cap engageable with the receptacle having an actuating portion and a measuring chamber portion. The actuating portion may include at least one valve to selectively permit dispensing of the dry ingredient from the receptacle and at least one actuator to actuate the valve between open and closed positions. For example, the valve may be a shutter valve and the actuator may be a button, where, as the button is depressed, the shutter valve is opened to permit flow of dry ingredient through the cap. At least a portion of the measuring chamber may include stepped features to allow measurement of the dry ingredient dispensed from the receptacle, e.g., each "step" of the measuring chamber may correspond to a given measurement amount such as ½ tsp, 1 tsp, 1 tbsp, etc. While the use of stepped features are disclosed, other suitable measurement indication features may be used in the measuring chamber, such as ramped features, conical features (e.g., a cone protruding from a base of the measuring chamber), or inverted conical features (e.g., the measuring chamber may have a funnel shape), or any other suitable features as the disclosure is not so limited.

According to another aspect, a dry ingredient dispenser is provided which may include a receptacle to contain dry ingredient, and a cap engageable with the receptacle having an actuating portion and a measuring chamber portion. The actuating portion may include a funnel that is configured to receive dry ingredient from the receptacle. The actuating portion may also include a valve, such as a cross-slit valve, which may be engageable with the funnel such that the funnel may be inserted through the valve to permit dispensing of the dry ingredient into the measuring chamber. To engage the funnel with the valve, the user may apply a force to the receptacle to move the receptacle linearly towards the direction of the cap, which may in turn move the funnel linearly towards a distal end of the cap, thus inserting the funnel at least partially through the valve to permit dispensing of the dry ingredient. In some embodiments, the valve may serve to prevent any dry ingredient accumulated in the funnel from reaching the measuring chamber when the funnel is not inserted sufficiently into the valve. The funnel and/or valve may be of any suitable size, shape, and/or other characteristic as the disclosure is not so limited. For example, the valve may exhibit elastic properties such that insertion of the funnel into the valve does not permanently deform the valve, but rather the valve may be permitted to return substantially to its original shape when no external force is exerted on it.

According to another aspect, a dry ingredient dispenser is provided which may include a receptacle to contain dry ingredient, and a cap engageable with the receptacle having an actuating portion and a measuring chamber portion. In some embodiments, the actuating portion may include an integrated grinding mechanism for use in grinding whole dry ingredient (e.g., peppercorns, salt) into ground dry ingredient. For example, the actuating portion may include a rotatable collar that permits grinding of the whole dry ingredient. In some embodiments, the actuating portion may include a burr (e.g., a conical burr) that progressively abrades the whole dry ingredient into a sufficiently fine amount of ground dry ingredient. The ground dry ingredient may then be dispensed into the measuring chamber.

Without wishing to be bound by theory, any suitable dry ingredient may be used in the dry ingredient dispenser embodiments disclosed herein. In some embodiments, a suitable dry ingredient for use in an ingredient dispenser may include, but is not limited to whole spices (e.g., peppercorns, salt), ground spices (e.g., ground pepper), sugar, yeast, salt, baking soda, baking powder, cocoa powder, yeast, flour, or any other suitable dry ingredient as the disclosure is not so limited.

Some other aspects disclosed herein relate to liquid ingredient dispensers which dispense measured amounts of liquid ingredient for a user. In some embodiments, a liquid ingredient dispenser includes a receptacle to contain the liquid ingredient, and a cap for dispensing measured amounts of the liquid ingredient. The cap may be in fluid communication with the receptacle via an inlet (e.g., a tube or port or other suitable inlet feature) to permit dispensing of liquid ingredient from the receptacle for the user. The cap may also include an actuator (e.g., a trigger) and a dispensing nozzle, where actuating the actuator causes the liquid ingredient to be dispensed from the receptacle through the inlet and out of the dispensing nozzle for consumer use. The amount of liquid dispensed from the liquid ingredient dispenser by the actuator may be selectively measured using any of a variety of suitable measurement features, which will be described in greater detail below.

As similarly noted above in reference to the embodiments of a dry ingredient dispenser, the receptacle of a liquid ingredient dispenser may be of any suitable size, shape, or other characteristic as the disclosure is not so limited. The receptacle of a liquid ingredient dispenser may also be constructed and arranged such that an opening of the receptacle is configured to be received by a corresponding cap via one or more engagement features disclosed herein. The receptacle may also be constructed of any suitable material as detailed above with respect to the dry ingredient embodiments, including plastics, glass, metals, or other suitable materials, and the receptacle may be clear or at least partially transparent or completely opaque.

In addition, as similarly noted above in reference to the embodiments of a dry ingredient dispenser, the cap of a liquid ingredient dispenser may be provided separately from a receptacle to the end user and the cap may be engageable with a variety of commercially available receptacles with varied opening sizes. In other embodiments, however, the cap of a liquid ingredient dispenser may be provided in conjunction with a corresponding receptacle directly to the end user. The cap of a liquid ingredient dispenser may be engageable with said receptacle via a variety of suitable engagement features including, but not limited to threaded features, an interference fit, or any other suitable fit as the disclosure is not so limited.

According to one aspect, a liquid ingredient dispenser is provided which may include a receptacle to contain the liquid ingredient, and a cap engageable with the receptacle that is capable of dispensing a measured amount of liquid ingredient for the user. The cap may include a rotatable collar which may be attached to a dispenser head. The rotatable collar may include at least one recess having a certain depth located along the circumference of the collar. In one embodiment, the rotatable collar includes a plurality of recesses, and each of the plurality of recesses have a varying depth. The cap of a liquid ingredient dispenser may also include a suitable actuator such as a trigger, and the actuator may be configured to interface with at least one recess of the rotatable collar to permit the dispensing of a select amount of liquid ingredient. For example, in some embodiments, the actuator may be a trigger, and the trigger may be depressed by a user such that a portion of the trigger recedes into a select recess of the collar, thereby causing an amount of liquid ingredient corresponding to an amount that the trigger is depressed to be dispensed from the dispenser nozzle of the cap.

According to another aspect, a liquid ingredient dispenser is provided which may include a receptacle to contain the liquid ingredient, and a cap engageable with the receptacle that is capable of dispensing a measured amount of liquid ingredient for the user. The cap may include a measuring chamber having a plurality of compartments, with each compartment corresponding to a different measurement volume. The cap may also be rotatable such that rotation of the cap aligns an opening of the cap with the receptacle to permit fluid communication between the receptacle and a select compartment of the cap. In one example, the measuring chamber may have three compartments: a first compartment having a measurement volume of 1 teaspoon (tsp), a second compartment having a measurement volume of 1 tablespoon (tbsp), and a third compartment in fluid communication with the receptacle to permit liquid ingredient to be freely dispensed for the user. In such an example, the cap may be rotated to align any of the compartments with the opening of the receptacle to permit a select amount of liquid ingredient to be dispensed. While such an arrangement of compartments in a measuring chamber is disclosed, the measuring chamber may have any suitable configuration of compartments as the disclosure is not so limited. The cap may also include a suitable actuator (e.g., a trigger), which may urge liquid ingredient from the receptacle through an inlet tube into one or more compartments of the plurality of compartments. The measuring chamber may have one or more spouts configured to dispense the accumulated liquid ingredient from one or more of the compartments for the user.

While some embodiments of a liquid ingredient dispenser disclosed herein describe use of an inlet tube to permit fluid communication with the receptacle, in some embodiments, the liquid ingredient dispenser may include pressurized components (e.g., a pressurized receptacle) to urge the dispensing of the liquid ingredient for the user. In some embodiments, a suitable liquid ingredient for use in an ingredient dispenser may include, but is not limited to oils, vinegar, soy sauce, liquid sugars, liquid sweeteners, liquid extracts, flavorings, or any other suitable liquid ingredient as the disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A shows an embodiment of a dry ingredient dispenser 100 having a receptacle 110, an actuating portion 120, and a measuring chamber 130. The receptacle 110 is used to contain a select amount of dry ingredient 111 and may be engaged with the actuating portion 120 via any suitable engagement features (e.g., threaded fit). In turn, the actuating portion 120 may be integrally formed with to the measuring chamber 130. Alternatively, the actuating portion may be removably engaged with the measuring chamber 130 via any suitable engagement features as disclosed herein. In either case, the actuating portion 120 and the measuring chamber 130 are collectively constituted as forming a cap that is engaged to the receptacle 110. The actuating portion 120 includes an actuator 121, such as a button, which is configured to dispense a select amount of dry ingredient from the receptacle 110 into the measuring chamber 130 when depressed. However, in FIG. 1A, the button 121 is shown in a non-depressed state. While the actuator in FIG. 1A is shown as a button 121, any suitable actuator may be used to dispense dry ingredient into the measuring chamber 130 as the disclosure is not so limited.

FIG. 1B shows an enlarged view of a distal region of the dry ingredient dispenser 100 of FIG. 1A. In FIG. 1B, the button 121 is shown in a depressed state such that dry ingredient 111 is dispensed from the receptacle 110 and into the measuring chamber 130.

The measuring chamber 130 is shown in FIGS. 1A and 1B as having a stepped region 131, with a "step" of the stepped region each having a defined measurement volume. The stepped region 131 may also be sloped such that as dry ingredient 111 falls into the measuring chamber 130, the dry ingredient proceeds to the base of the measuring chamber 130. In this way, the dry ingredient 111 progressively accumulates in the measuring chamber 130 and allows for a user to have a visual indication of the measurement volume of dispensed dry ingredient 111. In particular, each "step" of the stepped region 131 corresponds to a measurement volume (e.g., ¼ tsp, ½ tsp, 1 tsp, 1 tbsp, etc), which may be denoted by markings indicated on the exterior of the measuring chamber 130, as shown in FIGS. 1A and 1B.

Upon the need to dispense the accumulated dry ingredient 111 from the measuring chamber 130, a user may open the flip lid 133 provided on the base of the measuring chamber 130. The accumulated dry ingredient 111 may then be dispensed from holes 132 formed in the flip lid 133. While the embodiments of FIGS. 1A and 1B depict a flip lid 133 having a plurality of holes 132, any suitable lid arrangement may be used. For example, the lid formed on the base of the measuring chamber 130 may be sealed such that dry ingredient 111 may not be dispensed from the base. Alternatively, the measuring chamber 130 may be removable from the actuating portion 120, and the user may pour the dosed amount of dry ingredient 111 from the measuring chamber 130 through the opening previously engaged to the actuating portion 121.

FIG. 1C shows a cross-section view of the embodiment of FIG. 1A. As noted above, the dry ingredient dispenser 100 includes a receptacle 110, an actuating portion 120, and a measuring chamber 130. As can be seen in FIG. 1C, the actuating portion includes a button 121 that is engageable with a valve 122. The valve 122 may be constructed and arranged such that it prevents dry ingredient from being dispensed into the measuring chamber 130 when the valve is closed and only able to allow dispensing when the valve is opened. In one embodiment, the valve 122 may be constructed of silicon or any other suitable material such that depression of the button 121 temporarily deforms the valve 122 to allow dry ingredient from the receptacle 110 to be dispensed into the measuring chamber 130.

As can also be more easily seen in FIG. 1C, the stepped region 131 of the measuring chamber 130 are sloped such that once dry ingredient is dispensed from the receptacle 110 into the measuring chamber 130, the dry ingredient will be urged towards the base of the measuring chamber 130 and allowed to progressively accumulate in the stepped region 131.

Figure 1D:
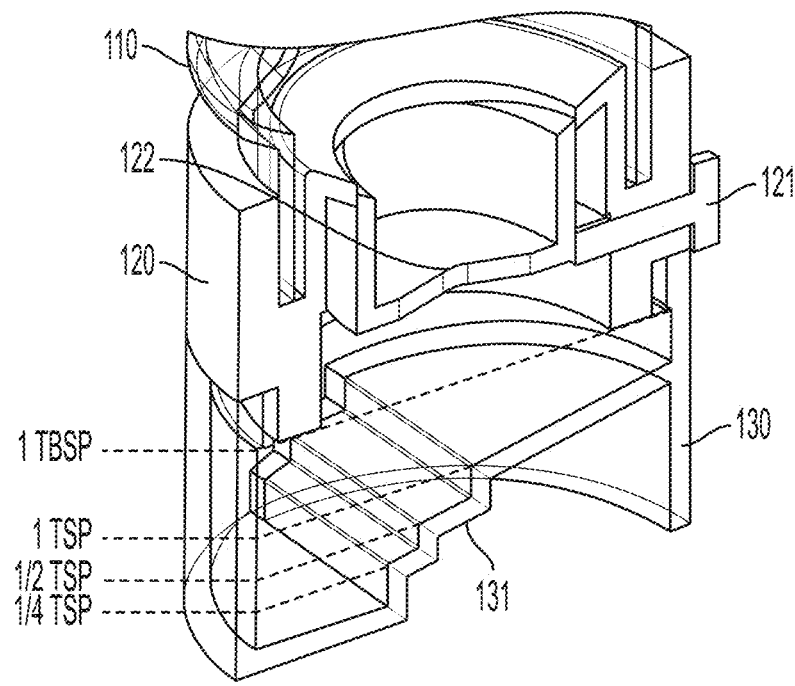
FIG. 1D is a cross-sectional perspective view of a distal region of the dry ingredient dispenser of FIG. 1A taken along like 1A-1A of FIG. 1A.

FIG. 1D shows a cross section view of a distal end region of the dry ingredient dispenser 100 of FIG. 1A. In particular, the actuating portion 120 and the measuring chamber 130 are shown in cross-section, with an end of the receptacle 110 also shown to be engaged with a recess of the actuating portion 120. The actuating portion 120 includes a button 121 which may be actuated against a valve 122 to open the valve 122 and allow dry ingredient to be dispensed into the measuring chamber 130. As similarly noted above, the measuring chamber 130 includes stepped region 131 which is sloped and denote certain measurement volumes. These specific measurement volumes can be more easily seen in FIG. 1D, with the each "step" constituting measurement volumes of ¼ tsp, ½ tsp, 1 tsp, and 1 tbsp, respectively, as the dry ingredient is sequentially accumulated.

While these illustrative measurement volumes are shown in FIG. 1D, any suitable measurement volumes may be used. Also, the capacity of the measuring chamber 130 may be selectively increased or decreased by adjusting the measuring chamber 130. For example, the measuring chamber 130 may include telescoping features to extend or retract the measuring chamber 130 relative to the actuating portion 120, thereby increasing or decreasing the measuring chamber capacity. In another example, the measuring chamber 130 may rotate relative to the actuating portion 120 such that the measuring chamber 130 may extend or retract relative to the actuating portion 120 to increase or decrease the measuring chamber capacity, respectively.

Figure 1E:
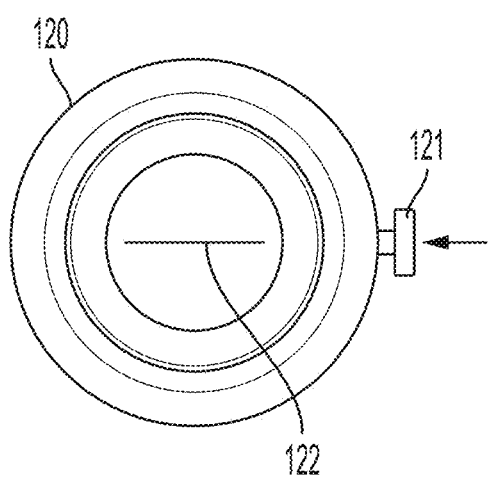
FIG. 1E is a bottom view of the dry ingredient dispenser of FIG. 1A with a measuring chamber removed for clarity, where a dispensing valve is in the closed position.
Figure 1F:
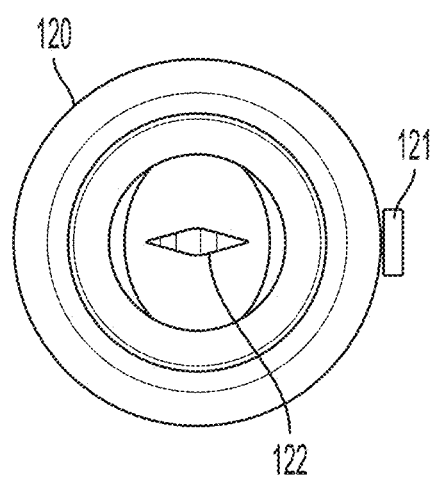
FIG. 1F is a bottom view of the dry ingredient dispenser of FIG. 1A with the measuring chamber removed for clarity, where a dispensing valve is in the open position.

FIGS. 1E and 1F show bottom views of the actuating portion 120 of FIG. 1A with the measuring chamber 130 removed for clarity. FIG. 1E shows the valve 122 in a closed position and the button 121 in an un-depressed position. By contrast, FIG. 1F shows the button 121 in a depressed position such that the valve 122 is opened to allow dry ingredient to be dispensed into the measuring chamber. FIG. 1F shows an opening formed in the middle of the valve 122. In such a configuration, the valve may be constructed and arranged such that a force provided by the button 121 in a depressed position will only urge the middle of the valve 122 into the open position, rather than another region of the valve 122. For example, the periphery of the valve 122 may be adhesively or otherwise secured to an interior wall of the actuating portion 120. However, without wishing to be bound by theory, the opening may be provided along any suitable location of the valve 122 when depressed by a button 121 or any other suitable actuator. For example, in some embodiments, an opening may not be included in the middle of the valve 122, but rather a periphery portion of the valve 122 may be configured to temporarily separate from an interior wall of the actuating portion 120, thereby opening a channel where dry ingredient may be dispensed into the measuring chamber 130. In either embodiment, depressing the button causes the valve to be squeezed in the direction along the axis of the button. That in turn causes the valve to move apart in the perpendicular direction such that the opening is created.

Figure 1G:
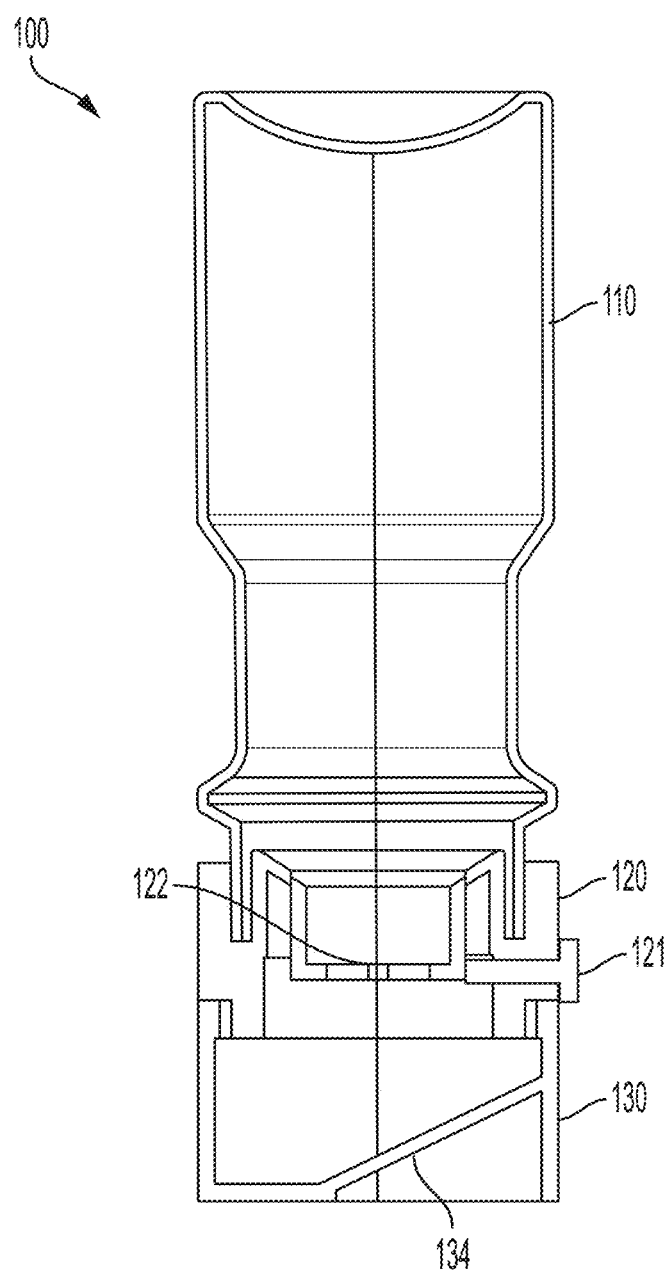
FIG. 1G is a cross-sectional schematic view of another embodiment of a dry ingredient dispenser, similarly taken along line 1A-1A of FIG. 1.

FIG. 1G shows a cross-sectional view of another embodiment of a dry ingredient dispenser similar to that of FIG. 1C. However, in contrast to FIG. 1C, the measuring chamber 130 of FIG. 1G includes a ramped surface 134 configured to serve as a measurement indicator of the amount of dry ingredient accumulated in the measuring chamber 130. The ramped surface 134 is sloped such that as dry ingredient is dispensed from the receptacle 110 into the measuring chamber 130, the dry ingredient will be urged towards the base of the measuring chamber 130. As similarly noted above in reference to the measuring chamber have a stepped region, the measuring chamber 130 having ramped surfaces 134 shown in FIG. 1G may have one or more markings that are configured to indicate a measurement volume of the measuring chamber 130. In some embodiments, these volume markings may be provided along the exterior of the measuring chamber 130.

Figure 2A:
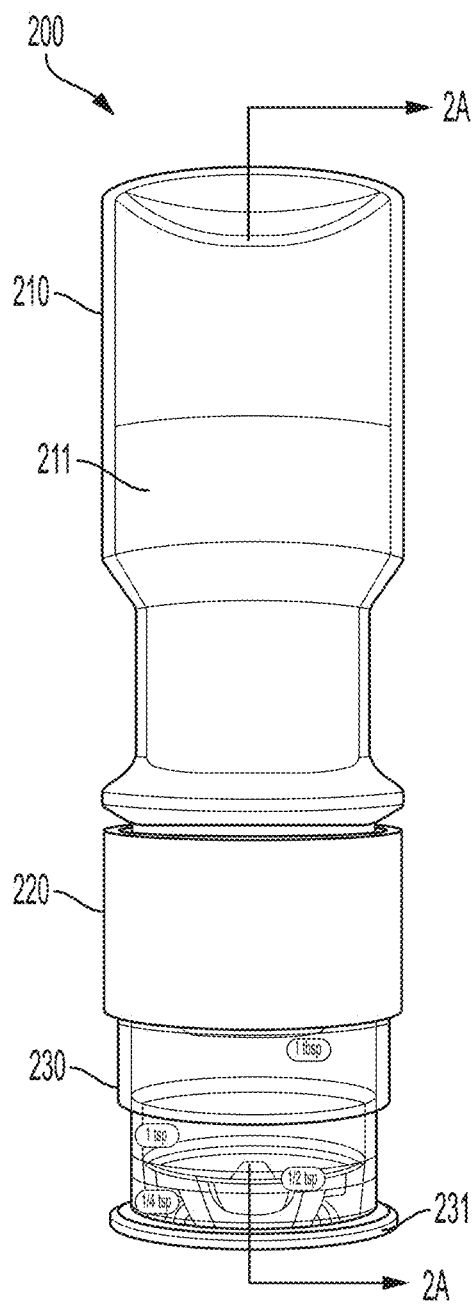
FIG. 2A is a perspective view of a dry ingredient dispenser according to another embodiment.

FIG. 2A shows another embodiment of a dry ingredient dispenser 200. The dry ingredient dispenser 200 includes a receptacle 210 containing dry ingredient 211, an actuating portion 220, and a measuring chamber 230. The receptacle 210 may be engaged with the actuating portion 220 via any suitable engagement features according to embodiments disclosed herein. In some embodiments, the actuating portion 220 may be integrally formed with the measuring chamber 230. In other embodiments, the actuating portion 220 may be removably engaged with the measuring chamber 230 via any suitable engagement features disclosed herein. The actuating portion 220 and the measuring chamber 230 are collectively constituted as forming a cap that is engaged to receptacle 210. The capacity of the measuring chamber 230 may be adjusted using suitable methods disclosed herein, such as by rotating the measuring chamber 230 relative to the actuating portion 220.

Figure 2B:
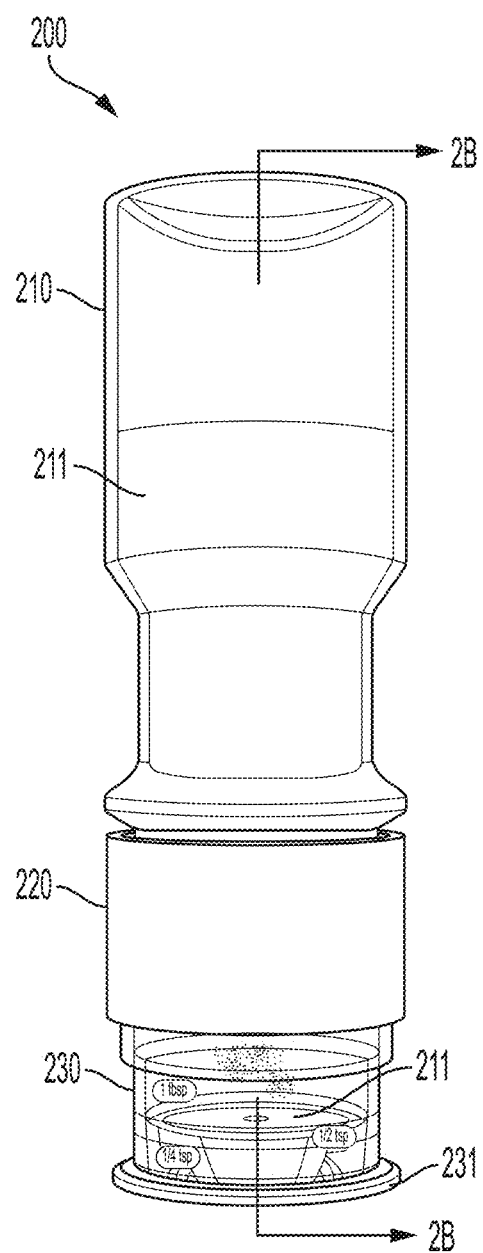
FIG. 2B is a perspective view of the dry ingredient dispenser of FIG. 2A, where the dispenser is actuated to dispense dry ingredient.

FIG. 2B shows the embodiment of FIG. 2A in an actuated state. In particular, a downwards force is shown to be applied to a proximal end of the receptacle 210 such that the receptacle 210 is moved towards a distal end region of the dry ingredient dispenser 200. This process causes the dry ingredient 211 to be dispensed from the receptacle 210 through the actuating portion 220 and into the measuring chamber 230. The measuring chamber 230 also includes a stabilizing structure 231 secured to the base of the measuring chamber 230, as shown in FIG. 2B.

The stabilizing structure 231 may be constructed of a rubberized or similar material to stabilize the dry ingredient dispenser 200 during an application of a downwards force to the receptacle 210 to dispense the dry ingredient 211.

The measuring chamber 230 may also include markings on the exterior of said chamber to indicate the measurement volumes of the dispensed ingredients, as shown in FIGS. 2A and 2B. In some embodiments, the measuring chamber 230 may include a flip lid to permit dispensing of the dry ingredient from the measuring chamber 230. In other embodiments, however, the measuring chamber 230 may be removable from the actuating portion 220 to permit dispensing of the dry ingredient from the measuring chamber 230.

Figure 2C:
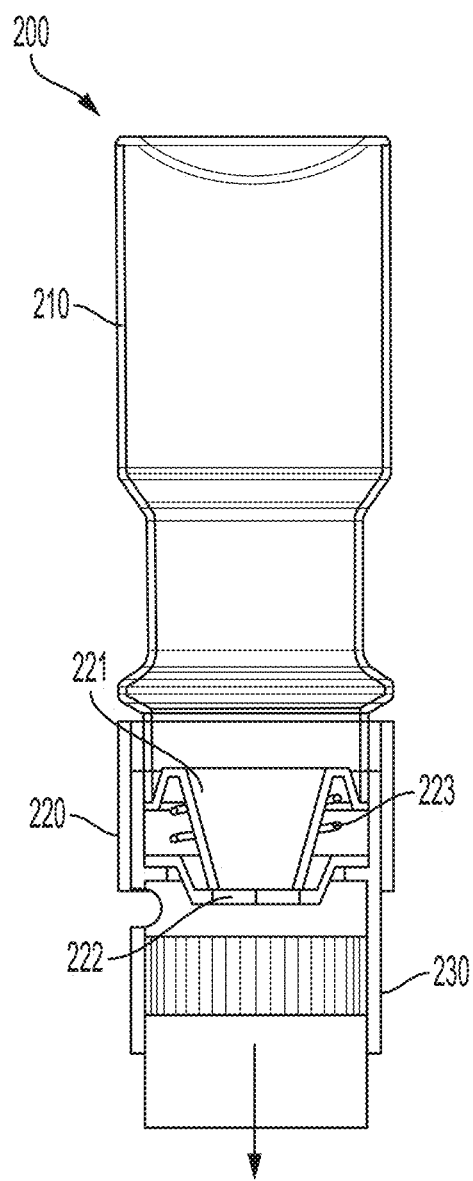
FIG. 2C is a cross-sectional view of the dry ingredient dispenser of FIG. 2A taken along line 2A-2A of FIG. 2A.
Figure 2D:
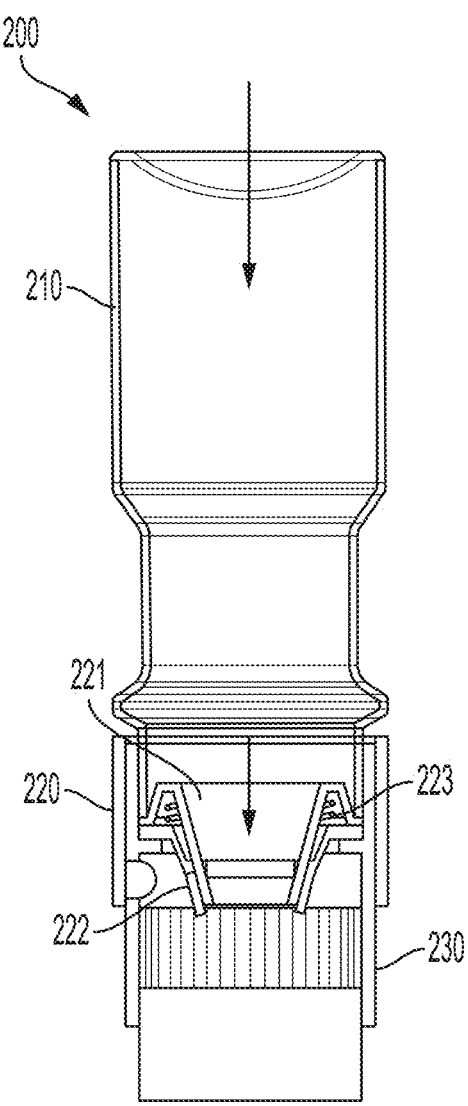
FIG. 2D is a cross-sectional view of the dry ingredient dispenser of FIG. 2B taken along line 2B-2B of FIG. 2B.

FIGS. 2C and 2D show cross-section views of FIGS. 2A and 2B, respectively. As can be seen in FIGS. 2C and 2D, the actuating portion 220 includes a funnel 221 and a valve 222, where the funnel 221 accumulates dry ingredient from the receptacle 210. The actuating portion 220 also includes a biasing element 223 disposed around a portion of the funnel 221. In FIG. 2C, the funnel-valve arrangement is shown in a non-actuated state, with the funnel 221 yet to be inserted at least partially into the valve 222. In FIG. 2D, the funnel-valve arrangement is shown in the actuated state, where the funnel 221 is at last partially inserted into the valve 222, thus permitting the dry ingredient accumulated in the funnel to be dispensed into the measuring chamber 230. As noted above, the funnel-valve arrangement may be actuated into the actuated state via application of a downwards force on the receptacle 210. However, when such a force is removed, the biasing element 223 permits the funnel 221 to be removed from the valve 222 to prevent further dry ingredient from being dispensed into the measuring chamber 230. The valve 222 may be configured as a cross-slit valve, as can be more easily seen in the embodiment of FIG. 2E described below.

Figure 2E:
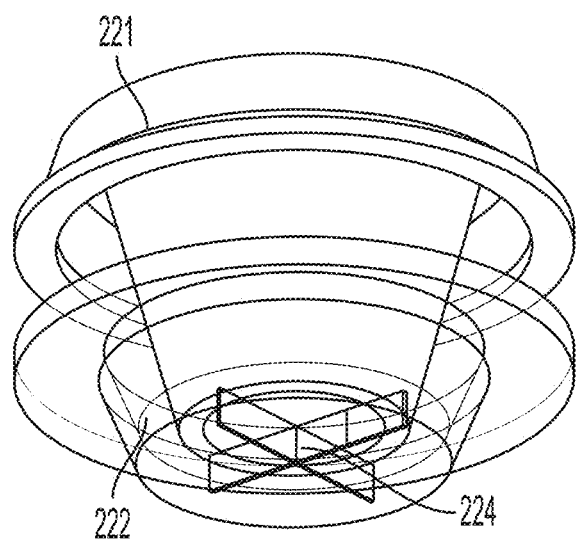
FIG. 2E is a perspective view of a funnel and valve arrangement included in the dry ingredient dispenser shown in FIG. 2C.

FIG. 2E shows a perspective view of the funnel-valve arrangement of FIGS. 2C and 2D. As shown in FIG. 2E, the funnel 221 is configured to be engaged with the valve 222. The valve 222 includes a cross-slit pattern 224 to permit insertion of the funnel 221 into the valve 222. In some embodiments, such as the one of FIG. 2E, the valve may be temporarily deformable such that once the funnel 221 is removed from the valve 222, the valve 222 may substantially return to its original shape to prevent the dispensing of dry ingredient into a corresponding measuring chamber.

Figures 2F, 2G:
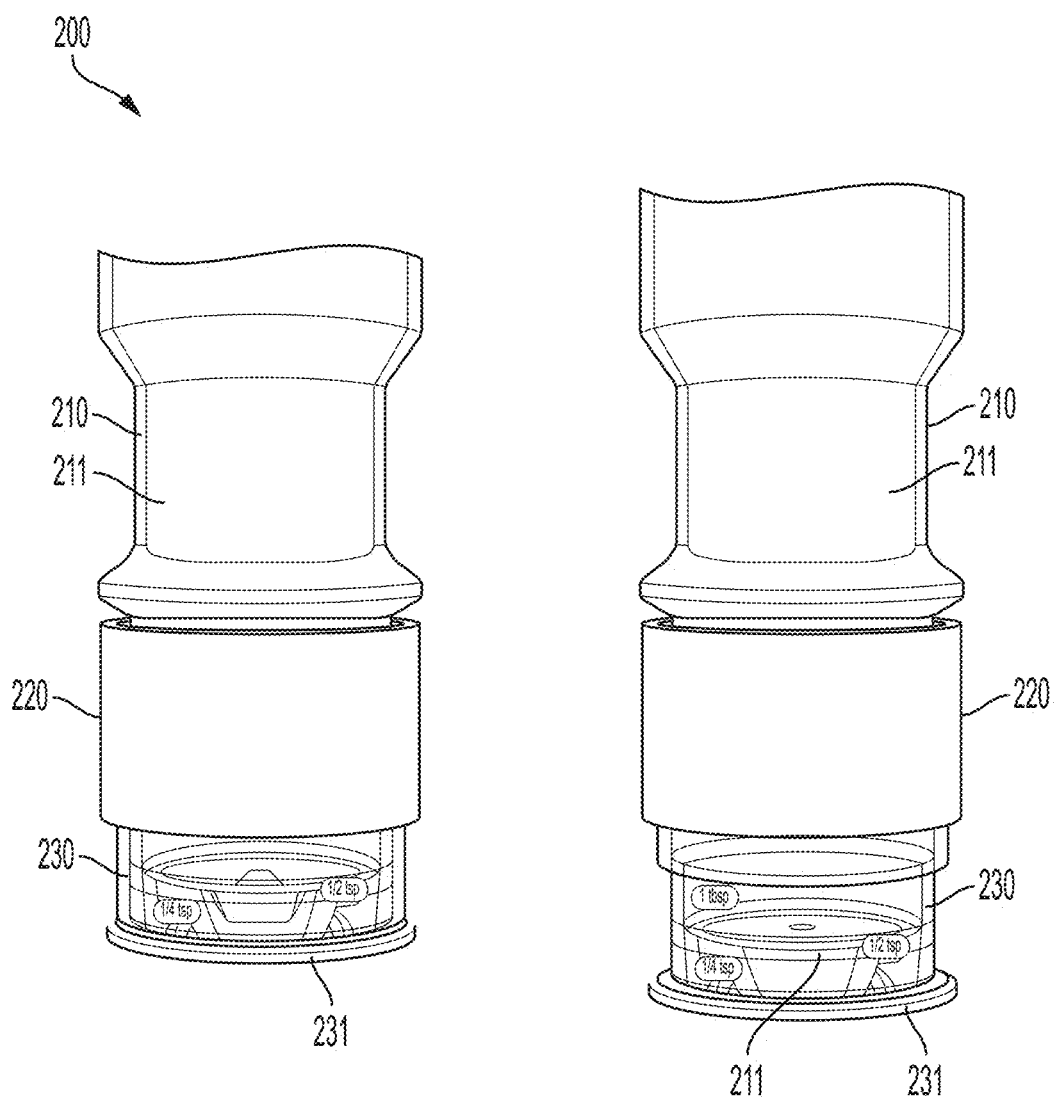
FIG. 2F is a perspective view of a distal region of the dry ingredient dispenser of FIG. 2A.
FIG. 2G is a perspective view of a distal region of the dry ingredient dispenser of FIG. 2A, where a measuring chamber capacity is adjusted.

FIGS. 2F and 2G show perspective views of the distal end region of the dry ingredient dispenser 200 of FIG. 2A, where the measuring chamber 230 capacity may be adjusted. Thus, in FIG. 2F, the measuring chamber is adjusted to a small volume, whereas in FIG. 2G, the measuring chamber is adjusted to a relatively larger volume. As disclosed in embodiments herein, the measuring chamber capacity may be adjusted using a variety of suitable methods including, but not limited to rotating the measuring chamber 230 relative to the actuating portion 220 to increase or decrease the measuring chamber capacity (e.g., via threaded features) and providing the measuring chamber 230 in two or more portions, where the portions may be extendable relative to one another (e.g., "telescoping" features). In particular, the embodiment of FIGS. 2F and 2G employ threaded features, where the measuring chamber 230 is rotated to extend the measuring chamber 230 relative to the actuating portion 220, thus increasing the measuring chamber capacity, as shown in FIG. 2G. In some embodiments, the measuring chamber may include both threaded features and telescoping features to increase and/or decrease the measuring chamber capacity as the disclosure is not so limited.

Figure 3A:
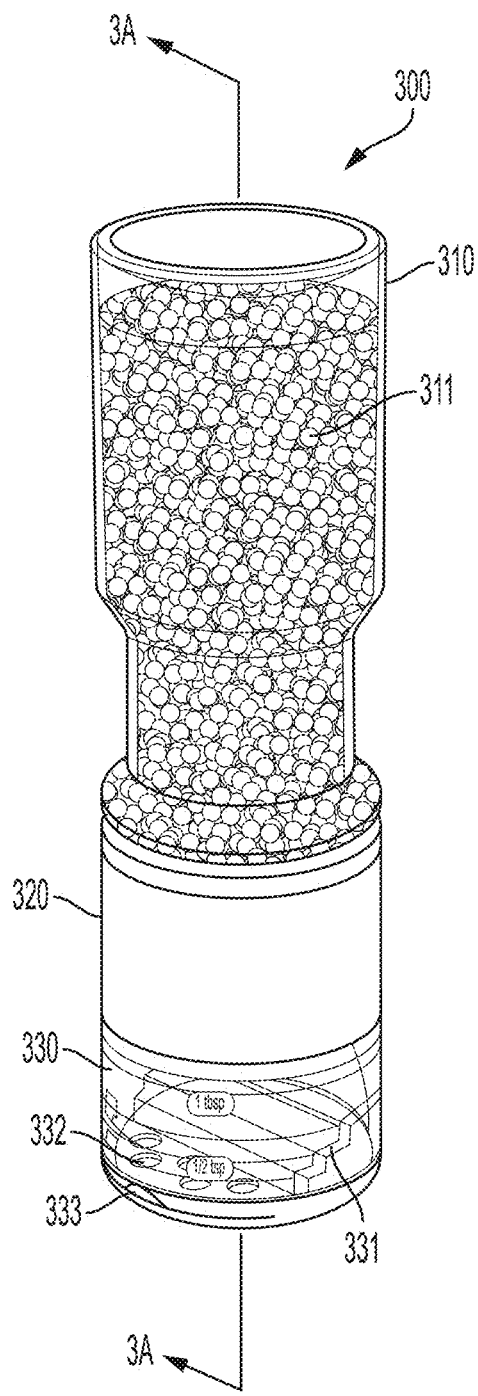
FIG. 3A is a perspective view of a dry ingredient dispenser incorporated with a grinder according to some embodiments.

FIG. 3A shows another embodiment of a dry ingredient dispenser 300 having a receptacle 310, an actuating portion 320, and a measuring chamber 330. Unlike the embodiments of FIGS. 1A-F and 2A-E, the embodiment of FIG. 3A shows the receptacle 310 as containing whole dry ingredient 311 (e.g., peppercorns or other whole ingredients). The receptacle 310 may be engaged with the actuating portion 320 via any suitable engagement features according to embodiments disclosed herein. In turn, the actuating portion 320 may be integrally formed with measuring chamber 330. Alternatively, the actuating portion 320 may be removably engaged with the measuring chamber 330 via any suitable engagement features as disclosed herein. In either case, the actuating portion 320 and the measuring chamber 330 are collectively constituted as forming a cap that is engaged to receptacle 310. Since the dry ingredient in FIG. 3A is whole dry ingredient 311, the actuating portion 320 includes incorporated grinding means for grinding the whole dry ingredient 311 into ground dry ingredient.

Figure 3B:
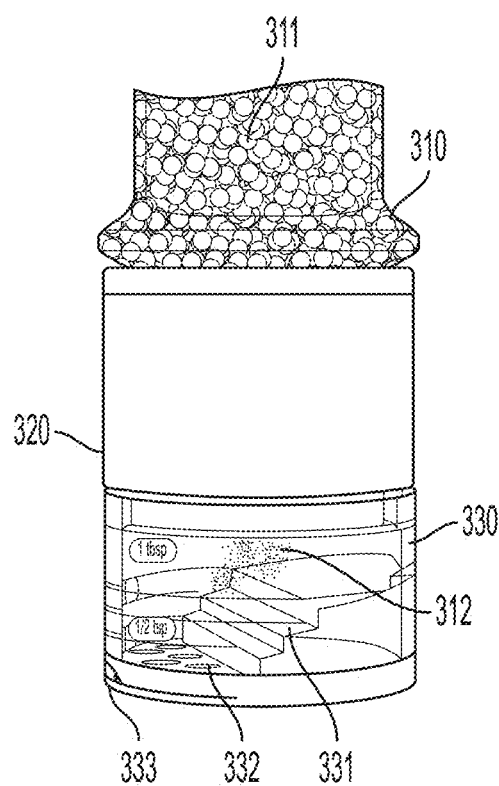
FIG. 3B is a perspective view of a distal region of the dry ingredient dispenser of FIG. 3A, showing actuation of the grinder.

FIG. 3B shows an enlarged view of a distal region of the dry ingredient dispenser 300 of FIG. 3A. In FIG. 3B, the exterior of the actuating portion 320 is shown to be rotatable relative to the receptacle 310 and/or measuring chamber 330 of the dry ingredient dispenser 300. The rotation of the actuating portion 320 serves to abrade the whole dry ingredient 311 to form ground dry ingredient 312, which may then be dispensed into the measuring chamber 330. An example grinding mechanism will be discussed in greater detail in reference to FIG. 3C below. In FIGS. 3A and 3B, the measuring chamber 330 is shown as having a stepped region 331 each having a defined measurement volume. The stepped region 331 is also sloped such that as ground dry ingredient 312 falls into the measuring chamber 330, the ground dry ingredient proceeds to the base of the measuring chamber 330. In this way, the ground dry ingredient 312 progressively accumulates in the measuring chamber 330 and allows for a user to have a visual indication of the measurement volume of the dispensed ground dry ingredient 312. As similarly noted above in reference to FIGS. 1A and 1B, each step of the stepped region 331 may correspond to a suitable measurement volume, which may be denoted by markings on the exterior of the measuring chamber 330. The user may dispense the accumulated ground dry ingredient 312 via a flip lid 333 having holes 332 provided on the base of the measuring chamber 330. Alternatively, the measuring chamber 330 may be removable from the actuating portion 320 to allow for the user to pour the dosed amount of ground dry ingredient 312.

Figure 3C:
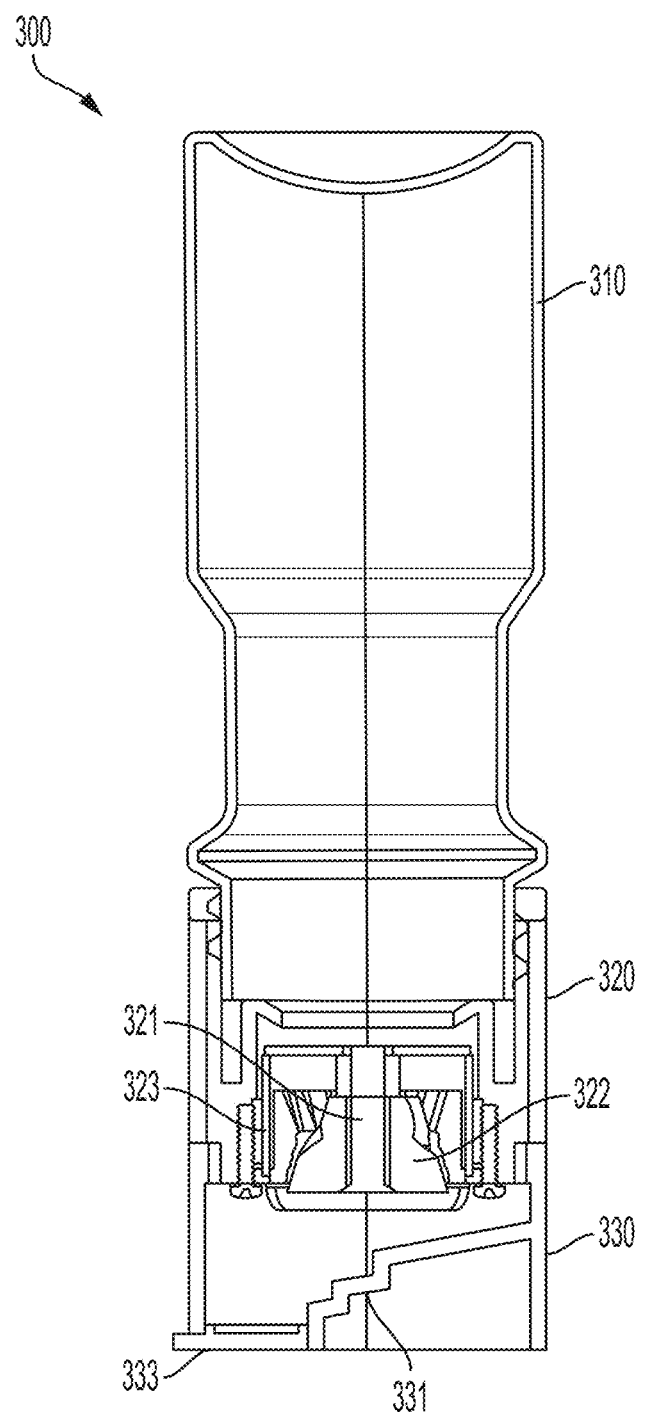
FIG. 3C is a cross-section view of the dry ingredient dispenser of FIG. 3A taken along line 3A-3A of FIG. 3A.

FIG. 3C shows a cross-section view of the dry ingredient dispenser 300 of FIG. 3A. As can be more easily seen in FIG. 3C, the actuating portion 320 may include a grinding mechanism to grind whole dry ingredient into ground dry ingredient having a sufficient degree of fineness. The grinding mechanism of FIG. 3C includes a conical burr grinder 322 affixed to a rotatable shaft 321. As the whole dry ingredient falls into the actuating portion 320, the whole dry ingredient may be initially restricted from entering the measuring chamber 330 due to the size of the whole dry ingredient being too large (e.g., the whole dry ingredient may be of a greater size than the distance between the periphery of the conical burr grinder 322 and the grinder chamber wall 323). Upon actuation of the rotatable shaft 321, the conical burr grinder 322 may rotate and abrade adjacent whole dry ingredient into ground dry ingredient having a sufficient fineness that is able to enter the measuring chamber 330.

Figure 4A:
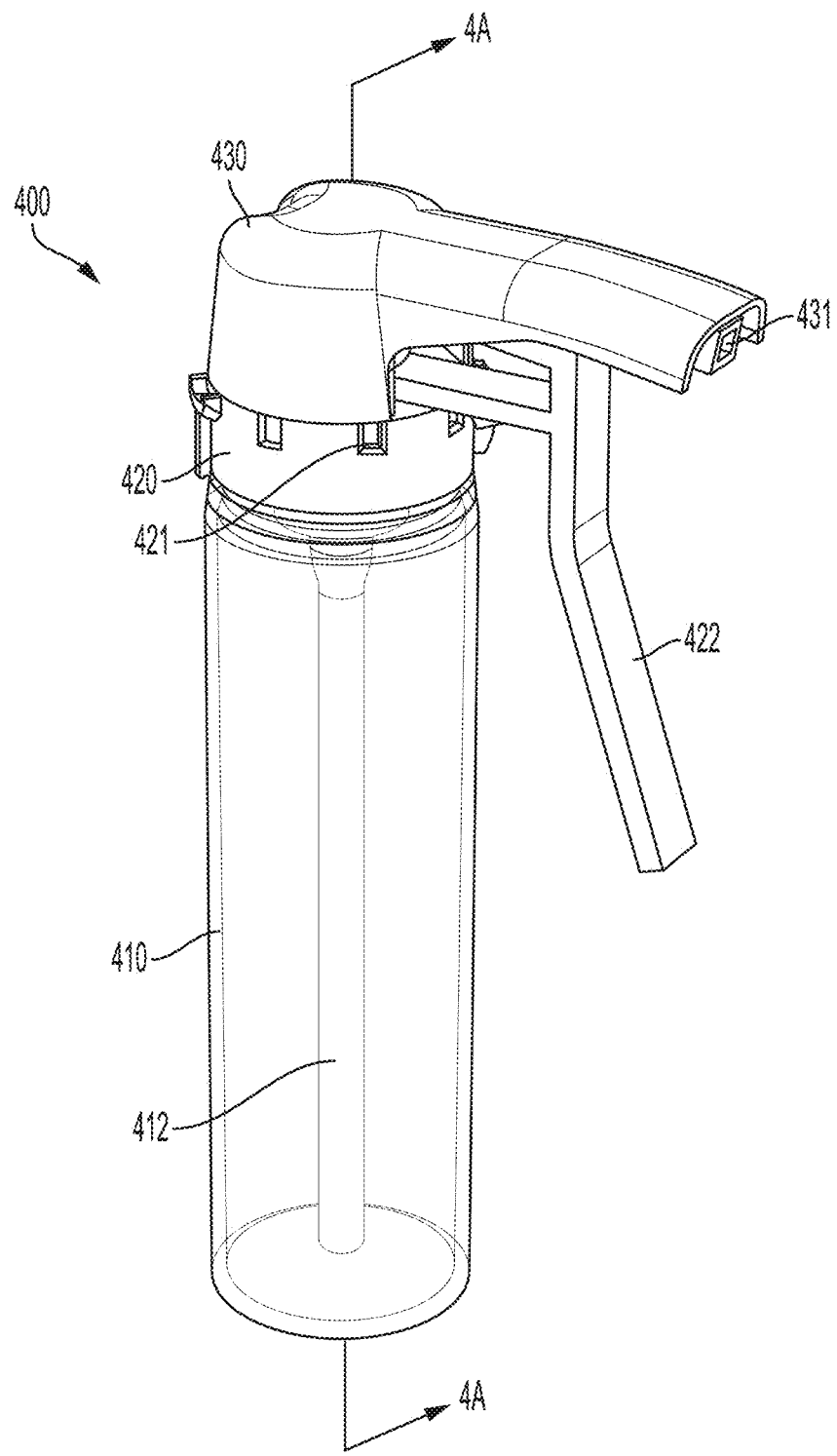
FIG. 4A is a perspective view of a liquid ingredient dispenser according to one embodiment.

FIG. 4A shows an embodiment of a liquid ingredient dispenser 400 having a receptacle 410, a rotatable collar 420, and a dispenser head 430. The receptacle 410 may be engaged with the rotatable collar 420 through any suitable engagement features (e.g., a threaded fit). The rotatable collar 420 may in turn be secured to the dispenser head 430 using any suitable engagement feature as the disclosure is not so limited.

The rotatable collar 420 includes a plurality of recesses 421 circumferentially positioned along the exterior of the rotatable collar 420. In FIG. 4A, each recess 421 is constructed and arranged to have a varying depth. The rotatable collar 420 may be rotated such that a recess 421 is aligned with an angular travel path of a trigger 422 or other suitable actuator. To dispense a measured amount of liquid ingredient from the receptacle 410, the trigger 422 is depressed such that a portion of the trigger 422 recedes into a selected recess 421. This action causes a select amount of liquid ingredient corresponding to a measurement value for said recess 421 to be dispensed from an inlet tube 412 in fluid communication with the contents of the receptacle 410 and out of a dispenser nozzle 431 disposed on the dispenser head 430. For example, the rotatable collar 420 may have four different recess depths corresponding to measurement volumes of ¼ tsp, ½ tsp, 1 tsp, and 1 tbsp, with the larger measurement volumes corresponding to greater recess depths (e.g., due to a greater angular travel path of the trigger 422). While such an example is provided, any suitable number of recesses may have any suitable depth corresponding to a given measurement volume.

Figure 4B:
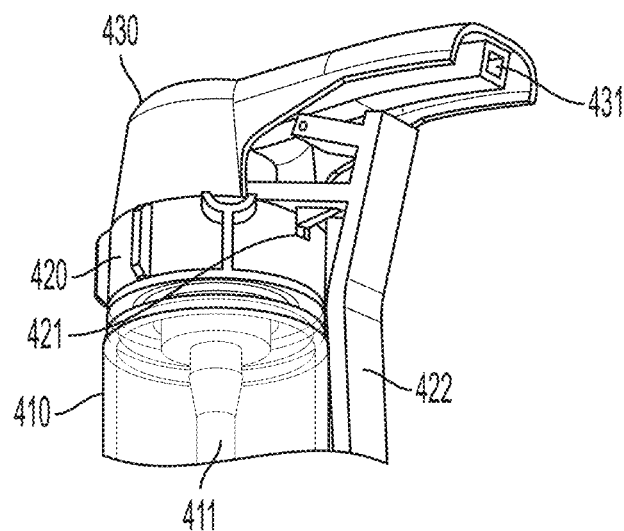
FIG. 4B is a front perspective view of a distal region of the liquid ingredient dispenser of FIG. 4A.

FIG. 4B is an enlarged perspective view of a distal end region of the liquid ingredient dispenser 400 of FIG. 4A. In contrast to FIG. 4A, the trigger 422 of FIG. 4B is shown in the actuated state, where a portion of the trigger 422 is received by a recess 421. As noted above, the actuated trigger 422 will in turn cause the amount of liquid ingredient corresponding to the depth of the recess 421 to be dispensed via the dispenser nozzle 431 for the user.

Figure 4C:
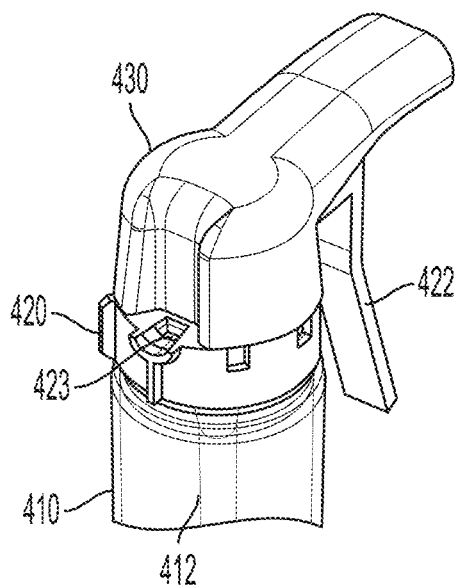
FIG. 4C is a rear perspective view of the of a distal region of the liquid ingredient dispenser of FIG. 4A shown in a different operating mode.

FIG. 4C is an enlarged rear perspective view of a distal end region of the liquid ingredient dispenser 400 of FIG. 4A, showing the rotatable collar 420 oriented such that the dispenser is in a "free flow" configuration. As used herein, the term "free flow" is used to refer to a configuration in which the liquid ingredient may be dispensed freely without first being measured to a select amount for the user. As can be seen in FIG. 4C, the rotatable collar 420 is rotated such that a collar opening 423 is exposed, providing a direct port from the receptacle 410. This configuration allows the user to freely pour liquid ingredient from the receptacle 410 as needed.

Figure 4D:
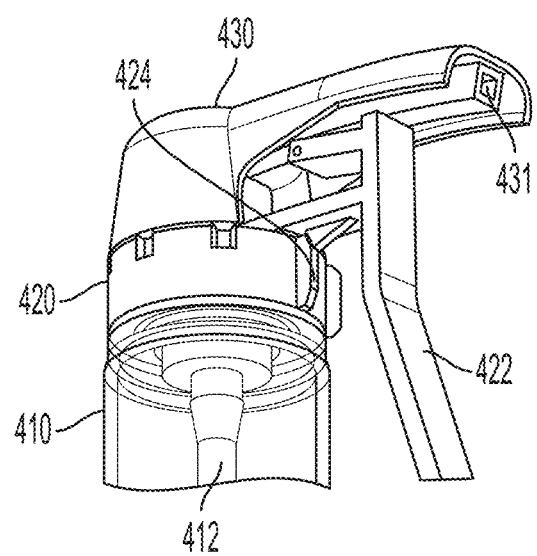
FIG. 4D is a front perspective view of the liquid ingredient dispenser of FIG. 4C.

FIG. 4D shows an enlarged front perspective view of a distal end region of the liquid ingredient dispenser 400 of FIG. 4A. As can be more easily seen in FIG. 4D, in the free flow configuration, the rotatable collar 420 is also oriented such that a rib 424 of the rotatable collar 420 is aligned with at least a portion of the trigger 422 to prevent the trigger 422 from being actuated to dispense liquid ingredient. Thus, in the free flow configuration, the liquid ingredient may only be dispensed from the collar opening 423.

Figure 4E:
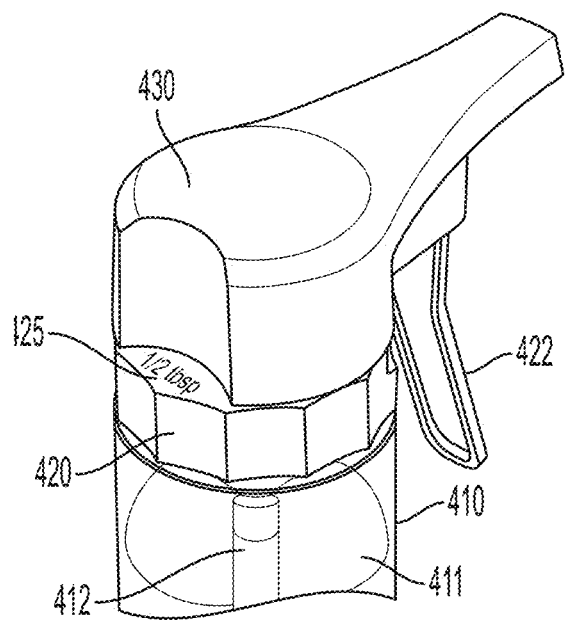
FIG. 4E is a perspective view of a distal region of a liquid ingredient dispenser, according to another embodiment.
Figure 4F:
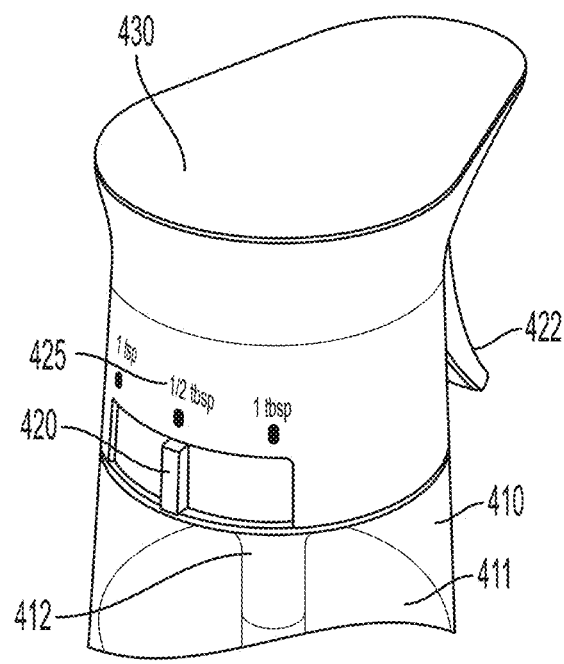
FIG. 4F is a perspective view of a distal region of a liquid ingredient dispenser, according to another embodiment.

FIGS. 4E and 4F each show perspective views of a distal end region of a liquid ingredient dispenser having a receptacle 410 containing liquid ingredient 411 (e.g., oil), a rotatable collar 420, and a dispenser head 430. The dispenser head 430 is in fluid communication with the liquid ingredient 411 via an inlet tube 412 extended into the receptacle 410. Dispenser head also includes a trigger 422 configured to dispense a measured amount of liquid ingredient 411 when actuated (e.g., depressed). FIGS. 4E and 4F show two different configurations of a rotatable collar 420. In FIG. 4E, the rotatable collar 420 is formed separately from a dispenser head 430 and rotatable such that a measurement volume indicator 425 is shown on a top surface of the collar 420. In FIG. 4F, the rotatable collar 420 is substantially sheathed by the dispenser head 430, such that a toggle of the rotatable collar 420 may be rotated to adjust a measurement volume of liquid ingredient 411 to be dispensed. FIG. 4F also shows that a measurement volume indicator 425 is disposed on the dispenser head 430 and not the rotatable collar 420. While these configurations are disclosed, any suitable arrangement of a rotatable collar and dispenser head may be employed for use in a liquid ingredient dispenser as the disclosure is not so limited.

Figure 4G:
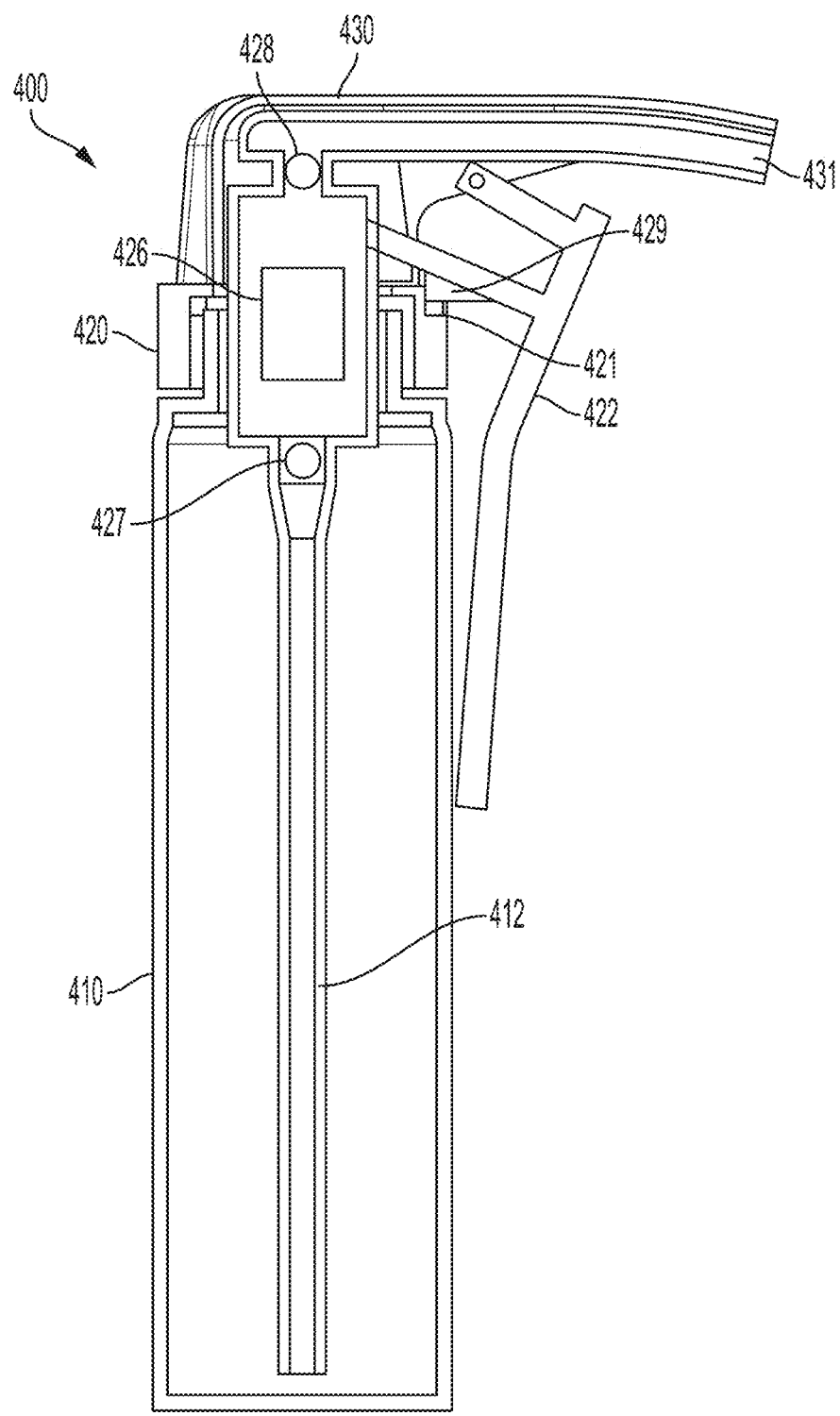
FIG. 4G is a cross-section view of another embodiment of the liquid ingredient dispenser of FIG. 4A taken along line 4A-4A of FIG. 4A.

FIG. 4G shows a cross-section view of another embodiment of a liquid ingredient dispenser 400, where the dispenser is schematically shown to include a pump 426 and one way valves 427 and 428. The pump 426 may be included to provide sufficient pressure to draw liquid ingredient from the receptacle 410 through the inlet 412 (e.g., an inlet tube), and out of the dispenser nozzle 431. In some such embodiments, the pump 426 may be operationally engaged with a trigger 422, and upon actuation of the trigger 422 such that a protruding rib 429 of the trigger 422 interfaces with recess 421, the pump 426 may begin to draw the liquid ingredient. The one way valves 427 and 428 (e.g., ball valves) may be employed to limit inadvertent flow of liquid ingredient out of the dispenser nozzle 431 of the dispenser head 430. As shown in FIG. 4G, the one way valves 427 and 428 may be positioned between the inlet 412 and the pump 426 as well as between the pump 426 and the dispenser nozzle 431, respectively. While pump 426 and one way valves 427 and 428 are shown in the embodiment of FIG. 4G, it should be appreciated that in some embodiments of a liquid ingredient dispenser, the pump 426 and one way valves 427 and 428 may not be present. In addition, while two one way valves 427 and 428 are shown in FIG. 4G, in some embodiments only one way valve may be present (e.g., between the inlet 412 and the pump 426 or between the pump 426 and the dispenser nozzle 431). Without wishing to be bound by theory, any suitable arrangement of pumps and valves may be in a liquid ingredient dispenser may be employed as the disclosure is not so limited.

Figure 5A:
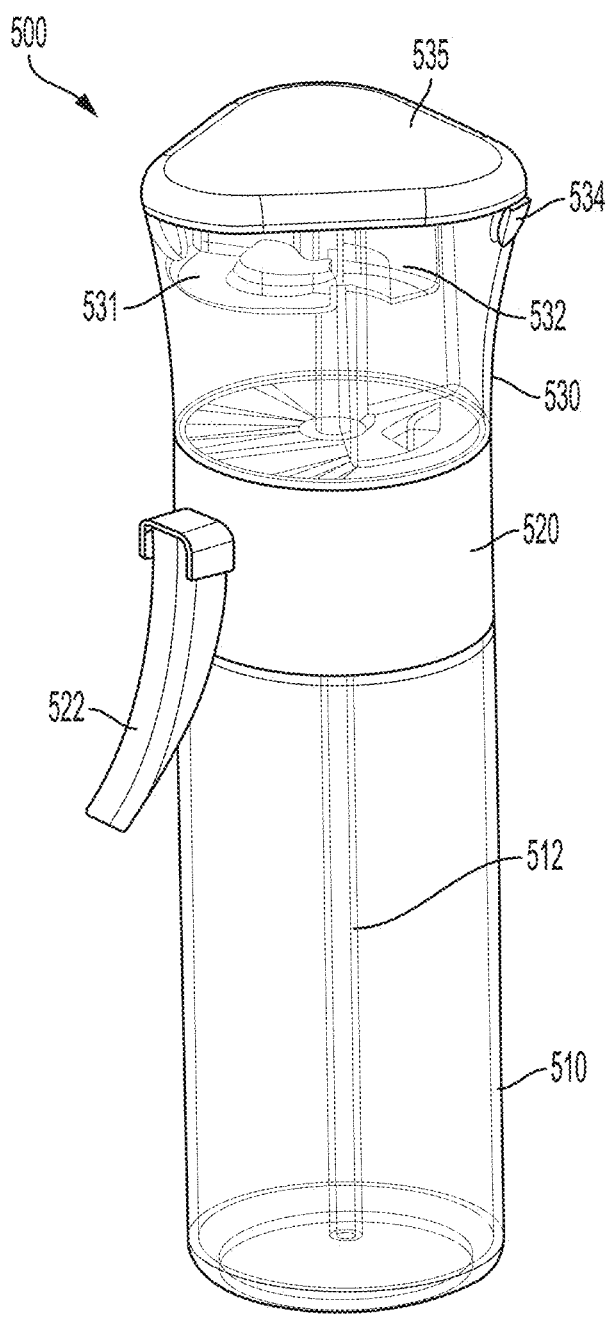
FIG. 5A is a perspective view of a liquid ingredient dispenser, according to another embodiment.

FIG. 5A shows another embodiment of a liquid ingredient dispenser 500 having a receptacle 510, an actuating portion 520, and a measuring chamber 530. The receptacle 510 may be engaged to the actuating portion 520 via any suitable engagement features such as a threaded fit, an interference fit, or any other suitable fit. The actuating portion may include a trigger 522 or any other suitable actuator (e.g., a button), which when depressed will urge liquid ingredient to flow from the receptacle 510 through an inlet tube 512 and into a measuring chamber 530. The measuring chamber 530 may include one or more compartments (531, 532) having a defined measurement volume which are configured to receive the liquid ingredient from the receptacle 510. The measuring chamber 530 may also be rotatable such that a select compartment of the one or more compartments may be aligned with an outlet of the inlet tube 512 to receive a measured amount of liquid ingredient, as can be more easily seen in FIG. 5B detailed below. Once the measured amount of liquid ingredient is received in the desired compartment of the measuring chamber 530, the liquid ingredient may be poured from the selected compartment via spouts 534. The measuring chamber 530 may also include a lid 535. In some embodiments, the spouts 534 may serve to permit dispensing of the liquid ingredient from the selected compartment despite whether or not the lid 535 is engaged to the measuring chamber 530.

Figure 5B:
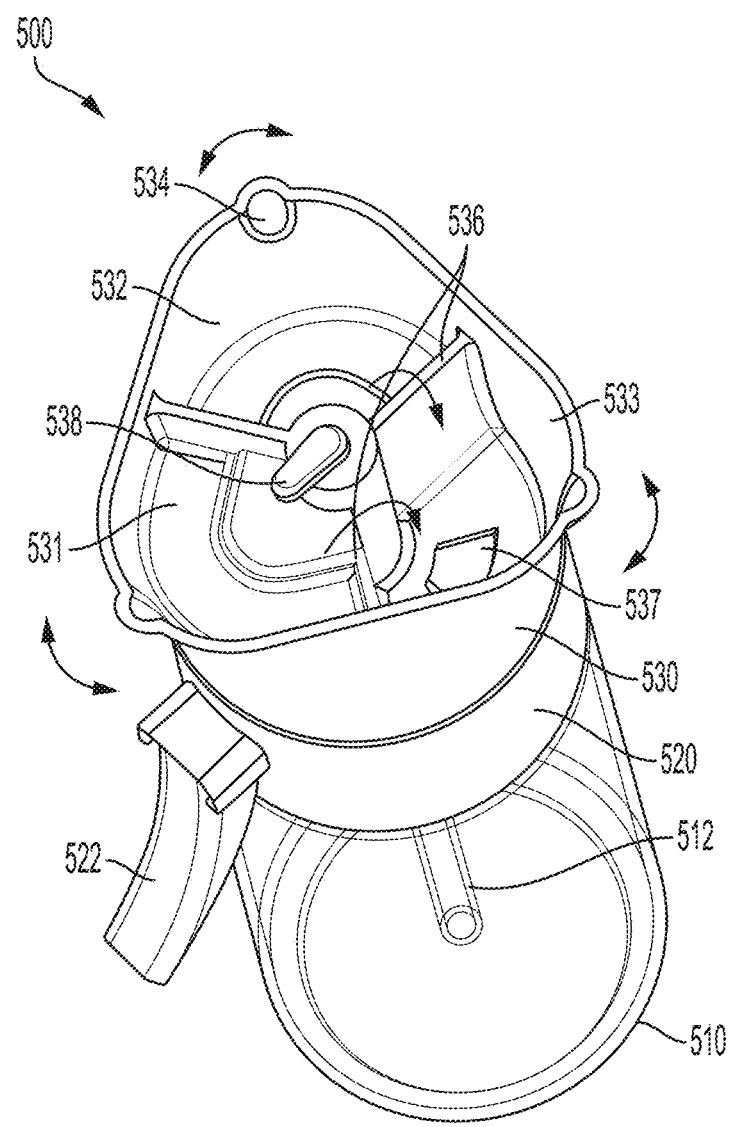
FIG. 5B is a perspective view of the liquid ingredient dispenser of FIG. 5A, where a cap is removed for clarity.

FIG. 5B shows a perspective view of FIG. 5A with the lid 535 removed for clarity. As can be seen in FIG. 5B, the measuring chamber 530 of the liquid ingredient dispenser 500 includes a first compartment 531 and a second compartment 532 which have measurement volumes of 1 tsp and 1 tbsp, respectively. The measuring chamber 530 also includes a third compartment 533 which allows the liquid ingredient to freely flow from the receptacle 510. While these compartments and corresponding measurement volumes are disclosed, any suitable number of compartments may be included in the measuring chamber 530, and the compartments may have any suitable measurement volume as the disclosure is not so limited. As noted above, the measuring chamber 530 may be rotated relative to the receptacle 510 to align a select compartment relative to an outlet 538 of an inlet tube 512 to permit dispensing of said liquid ingredient into the selected compartment. In FIG. 5B, the outlet 538 is shown to be aligned with the first compartment 531. The compartments (531, 532, 533) may also include walls 536 which separate the compartments from one another.

In some embodiments, the user may pump an excessive amount of liquid ingredient into one or more of the compartments (531, 532, 533). In some such embodiments, the excess liquid ingredient may flow over the walls 536 separating the compartments and return into the receptacle 510 via a free flow opening 537. In some embodiments, the free flow opening 537 may be in fluid communication with the receptacle 510 regardless of which compartment is aligned with the outlet 538, thus permitting a user to use the "free-flow" mode in any suitable configuration.

Figure 6A:
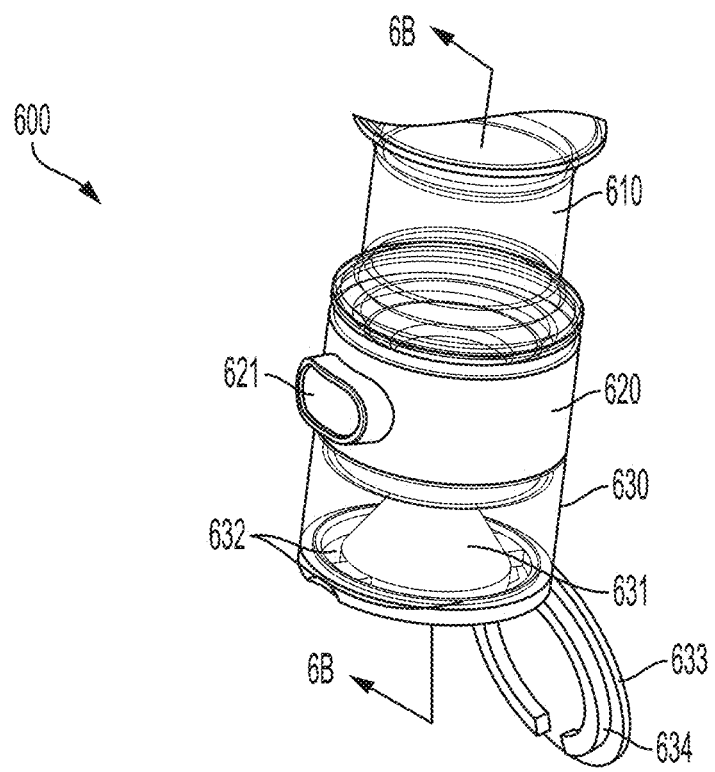
FIG. 6A is a perspective view of a distal region of a dry ingredient dispenser, according to one embodiment.

FIG. 6A shows an embodiment of a distal region of a dry ingredient dispenser 600. The dry ingredient dispenser 600 includes a receptacle 610, an actuating portion 620, and a measuring chamber 630. A user may depress a button 621 to permit dispensing of dry ingredient from the receptacle 610 into the measuring chamber 630. The measuring chamber 630 may include a conical surface 631 that is configured to urge dry ingredient falling into the measuring chamber 630 towards the base of the measuring chamber 630. The measuring chamber 630 may also include a flip lid 633 with one or more protuberances 634 formed thereon that are configured to enclose one or more openings 632 adjacent a base of the conical surface 631 when the flip lid is in a closed configuration. In some embodiments, the measuring chamber 630 and/or the conical surface 631 may be transparent or translucent to permit a user to view the contents within the interior of the measuring chamber.

Figure 6B:
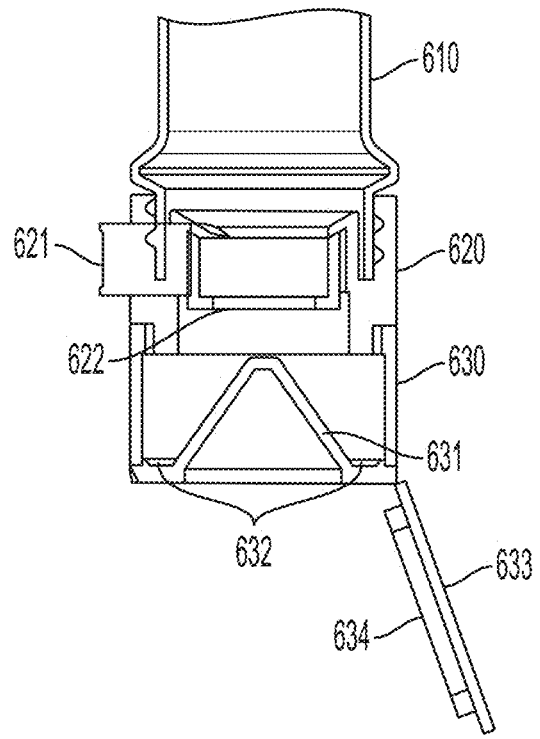
FIG. 6B is a cross-section view of the distal region of the dry ingredient dispenser of FIG. 6A taken along line 6B-6B of FIG. 6A.

FIG. 6B shows a cross-section view of the dry ingredient dispenser 600 of FIG. 6A taken along line 6B-6B where the actuating portion 620 is shown in greater detail. A user may depress the button 621 as noted above which will apply a compressive force to a valve 622 to in turn cause the valve 622 to urge open, thereby permitting dry ingredient to fall from the receptacle 610 into the measuring chamber 630. In particular, the valve 622 may be compressible (e.g., constructed of a flexible material such as silicon) and include a slit or other form of opening, and the abutment of the button 621 against the side of the valve 622 may cause the valve to compress and the slit to splay open.

Figure 7A:
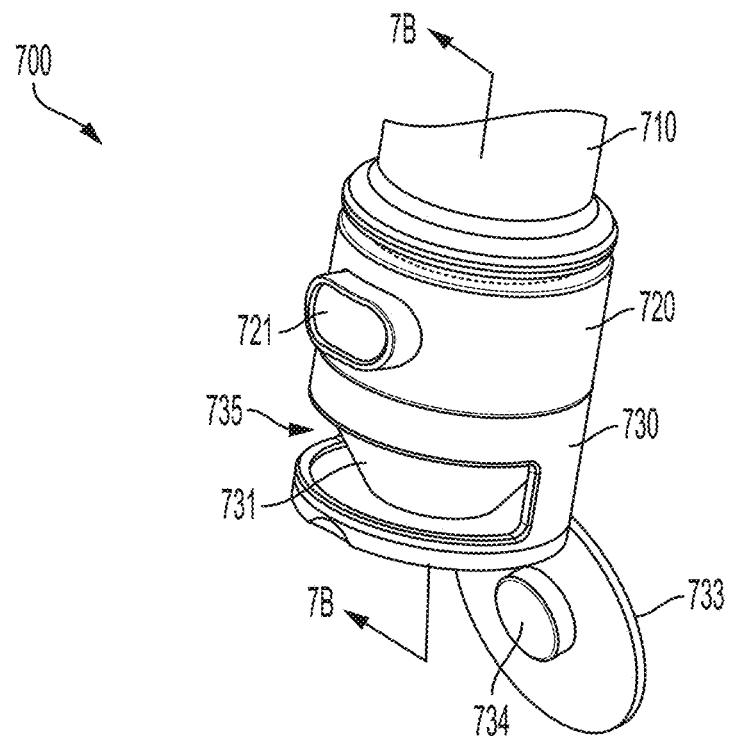
FIG. 7A is a perspective view of a distal region of a dry ingredient dispenser, according to another embodiment.

FIG. 7A shows another embodiment of a distal region of a dry ingredient dispenser 700. The dry ingredient dispenser 700 includes a receptacle 710, an actuating portion 720, and a measuring chamber 730. A user may depress a button 721 to permit dispensing of dry ingredient from receptacle 710 into measuring chamber 730. In contrast to the embodiment of FIG. 6A, the embodiment of FIG. 7B includes an inverted conical surface 731 that is configured to urge dry ingredient falling into the measuring chamber 730 towards the base of the measuring chamber 730. The measuring chamber 730 may also include a flip lid 733 with one or more protuberances 734 formed thereon that are configured to enclose one or more openings 732 adjacent a base of the inverted conical surface 731 when the flip lid 733 is in a closed configuration. In some embodiments, the measuring chamber 730 may fully surround the inverted conical surface 731 to enclose the measuring chamber 730. In other embodiments, however, the measuring chamber may have an opening 735 of any suitable shape or size disposed along the measuring chamber. In some embodiments, the measuring chamber 730 itself may not be transparent, but the inverted conical surface 731 may be transparent. In such a configuration it may be beneficial to have the opening 735 to permit a user to view the dry ingredient contents within the inverted conical surface 731. In some embodiments, either of the measuring chamber 730 and/or the inverted conical surface 731 may be transparent or translucent to permit a user to view the interior of the measuring chamber.

Figure 7B:
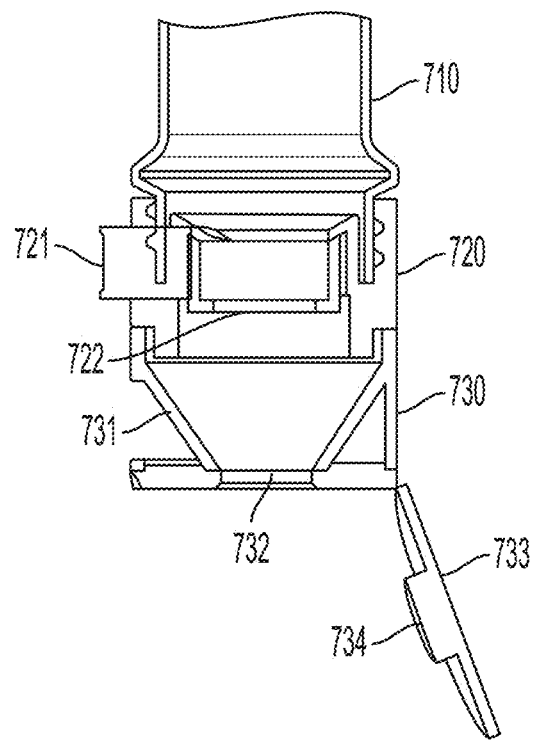
FIG. 7B is a cross-section view of the distal region of the dry ingredient dispenser of FIG. 7A taken along line 7B-7B of FIG. 7A.

FIG. 7B shows a cross-section view of the dry ingredient dispenser 700 of FIG. 7A taken along line 7B-7B where the actuating portion 720 is shown in greater detail. Similar to FIG. 6B, in FIG. 7B a user may depress the button 721 which may apply a force to a compressible valve 722. The compressible valve 722 may include a slit or other form of opening, and the abutment of the button 721 against the side of the valve 722 may cause the valve to compress and the slit to splay open, which will permit dry ingredient to fall from the receptacle 710 into the measuring chamber 730. While the embodiments of FIGS. 6A-B and 7A-B have been disclosed, any suitable measuring chamber arrangement may be employed to urge the falling ingredient towards a base of the chamber to promote accurate measurements of ingredient. For example, in some embodiments, the measuring chamber may include a pyramidal surface or an inverted pyramidal surface to urge the falling dry ingredient towards the base of the measuring chamber as the disclosure is not so limited. The measuring chamber may also include one or more markings to indicate a select measurement volume of a region of the measuring chamber. In some embodiments, the lid may be configured to provide a seal with a portion of the measuring chamber to prevent dry ingredient from dispensing from the measuring chamber unless the lid is in the open configuration.

Figure 8A:
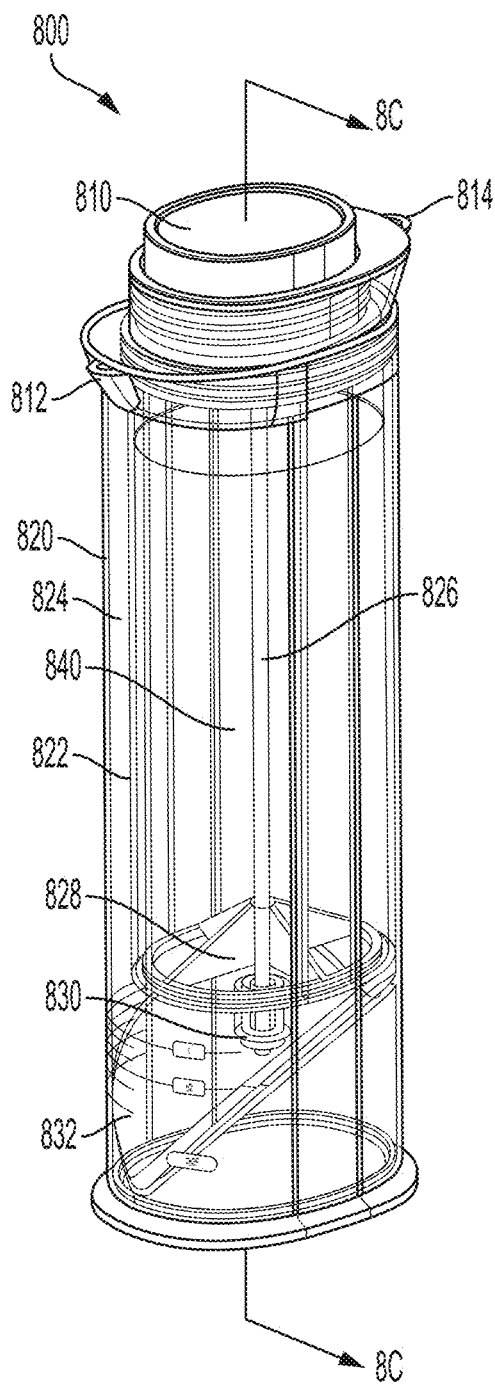
FIG. 8A is a perspective view of a liquid ingredient dispenser, according to another embodiment.

FIG. 8A shows a perspective view of a liquid ingredient dispenser 800 in a non-actuated state. The liquid ingredient dispenser 800 includes a button 810, an outer receptacle 820, and an inner receptacle 822 which is configured to hold a volume of liquid ingredient 840. The liquid ingredient dispenser 800 also includes an outer spout 812 and a free-flow spout 814. The button 810 may be coupled to a shaft 826 and a plunger 830 which are configured to move vertically within the dispenser in response to actuation of the button 810. A support 828 may be coupled to the shaft 826 to retain the shaft in a desired lateral position within the dispenser.

Figure 8B:
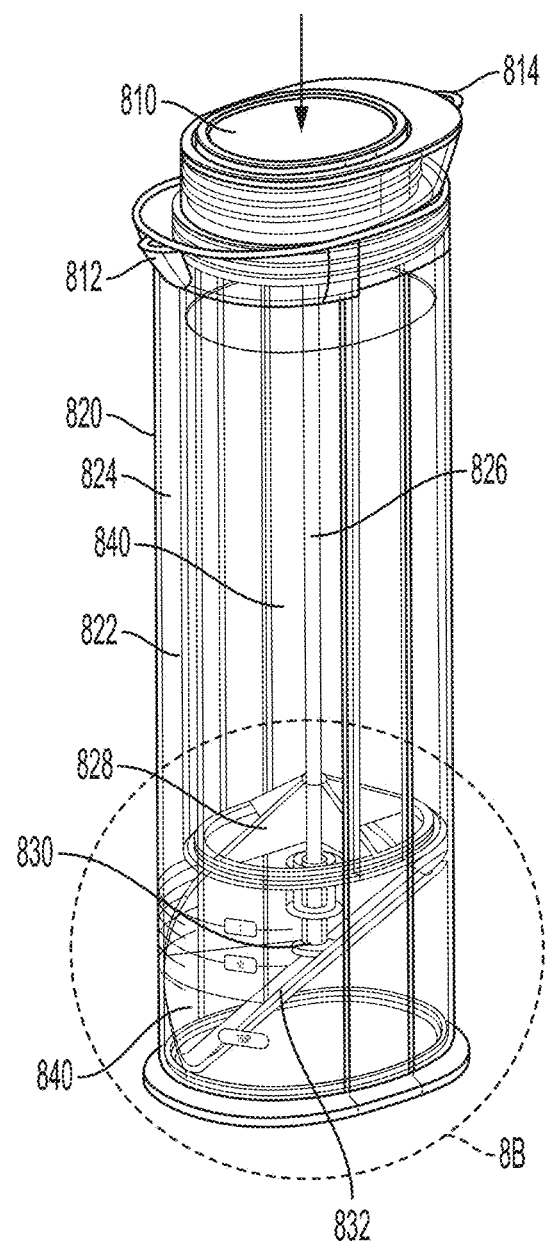
FIG. 8B is a perspective view of the liquid ingredient dispenser of FIG. 8A where the dispenser is actuated to dispense liquid ingredient.

FIG. 8B shows the liquid ingredient dispenser 800 of FIG. 8A in an actuated state where the button 810 is depressed. When the button 810 is depressed, the plunger 830 may move downwards and disengage from a distal portion of the inner receptacle 822, thereby permitting liquid ingredient 840 to dispense into a sloped measuring chamber 832. Once a desired amount of liquid ingredient 840 is dispensed into the measuring chamber 832, a user may disengage the button 810 to move the plunger 830 upwards and against the distal portion of the inner receptacle 830 to prevent further dispensing of the liquid ingredient. With the select amount of liquid ingredient 840 in the measuring chamber 832, the user may then tilt the dispenser such that the liquid ingredient is dispensed via a passage 824 out of the outer spout 812. Without wishing to be bound by theory, the measuring chamber 832 may be of any suitable shape (e.g., elongated V-shape as shown in FIGS. 8A-B), size, or other characteristic as the disclosure is not so limited. In addition or alternatively, a user may dispense liquid ingredient 840 from the inner receptacle 822 via free-flow spout 814. In some embodiments, a stopper (not shown) may be employed to enclose the free-flow spout 814 to prevent dispensing of the liquid ingredient.

Figure 8C:
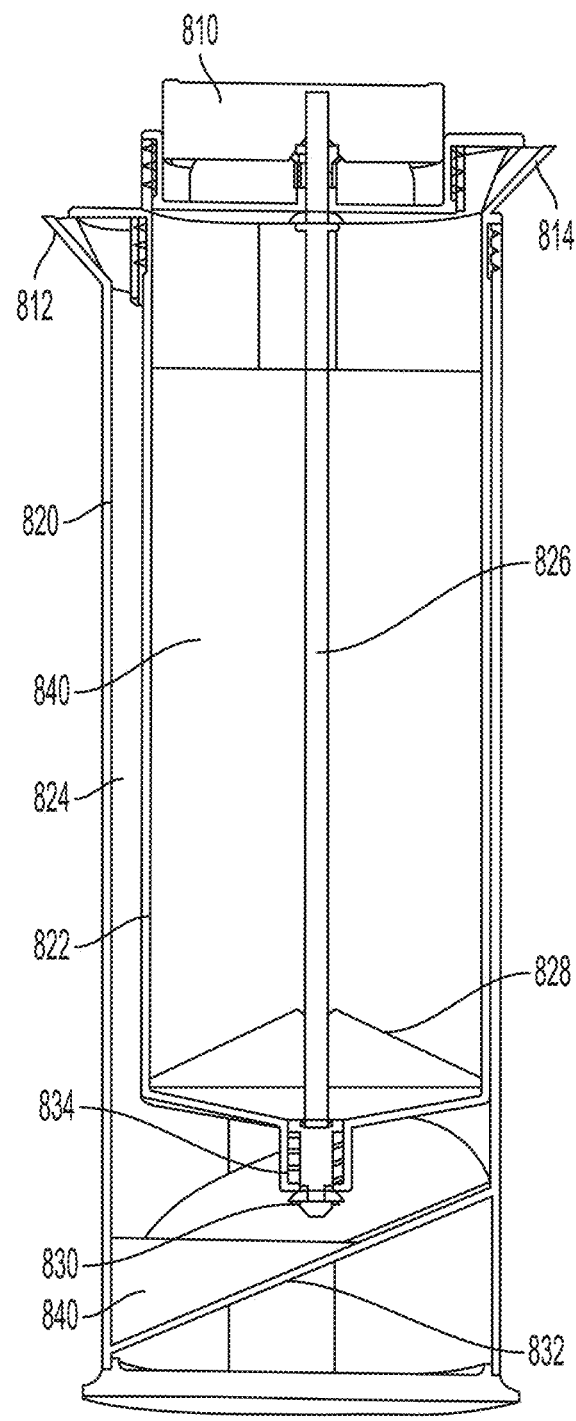
FIG. 8C is a cross-section view of the liquid ingredient dispenser of FIG. 8A taken along line 8C-8C of FIG. 8A.

FIG. 8C shows a cross-section view of the liquid ingredient dispenser of FIG. 8A taken along line 8C-8C. As can be more easily see in FIG. 8C, the liquid ingredient 840 may accumulate in the measuring chamber 832, and then the user may tilt the dispenser to flow the liquid ingredient that is in the measuring chamber 832 through passage 824 which is located between the outer receptacle 820 and the inner receptacle 822.

Figure 8D:
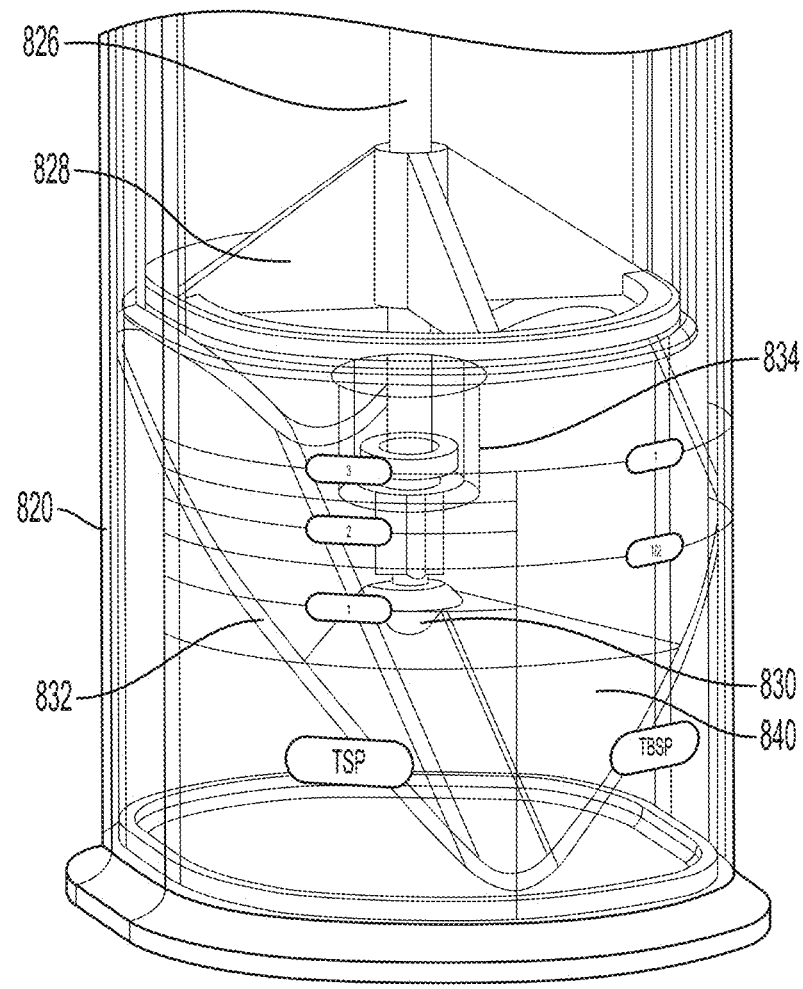
FIG. 8D is an enlarged perspective view of region 8B of FIG. 8B.

FIG. 8D shows an enlarged view of region 8B of FIG. 8B where the plunger 830 is shown in an actuated state (i.e., the button is depressed) such that the liquid ingredient 840 is configured to flow into the measuring chamber 832. The measuring chamber 832 may include any suitable number of volume markings as shown in FIG. 8D to indicate a measurement of the accumulated liquid ingredient 840.

Figure 9A:
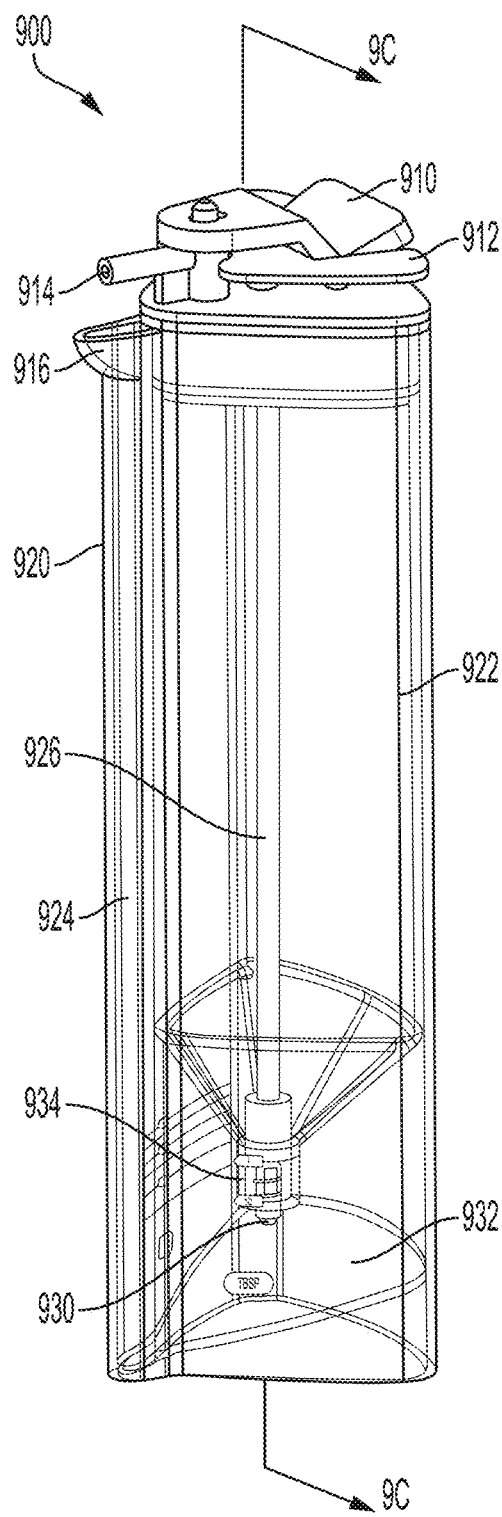
FIG. 9A is a perspective view of a liquid ingredient dispenser, according to another embodiment.

FIG. 9A shows a perspective view of a liquid ingredient dispenser 900 in a non-actuated state. The liquid ingredient dispenser 900 includes a lever 910 and a button 912. In some embodiments, the lever 910 may be pressed downwards to permit flow of liquid ingredient from a free-flow spout 914, as can be more easily seen in FIG. 9D discussed below. The dispenser 900 also includes an outer receptacle 920 and an inner receptacle 922 which is configured to hold a volume of liquid ingredient. The outer receptacle 920 includes an outer spout 916 configured to dispense liquid ingredient accumulated in a sloped measuring chamber 932 of the dispenser when the dispenser is tilted. The button 912 is coupled to a shaft 926 as well as a plunger 930 which are each configured to move downward in response to depression of the button 912.

Figure 9B:
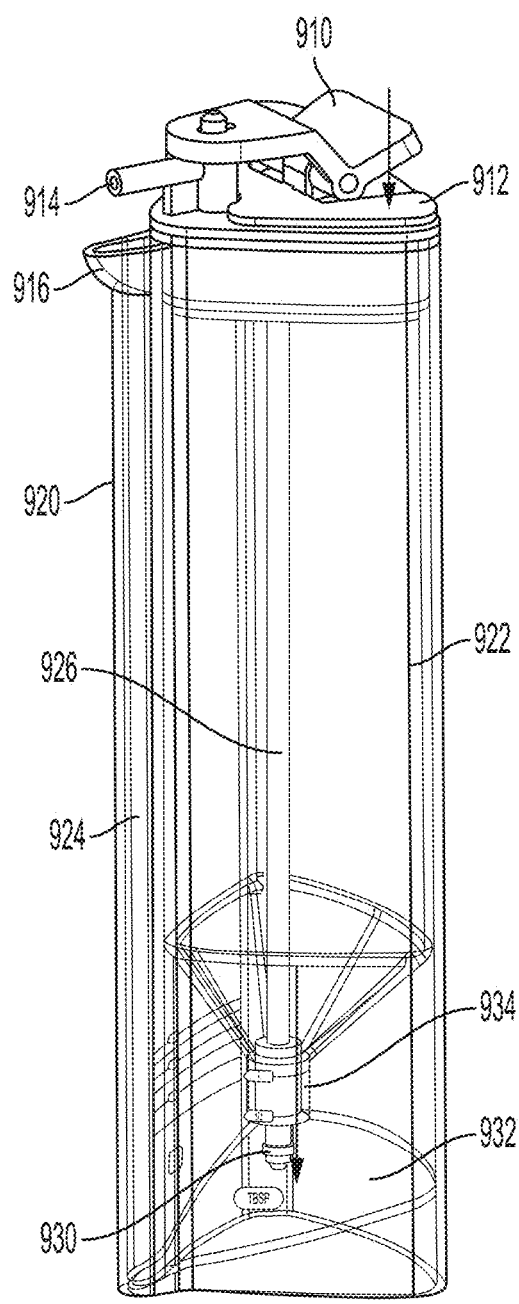
FIG. 9B is a perspective view of the liquid ingredient dispenser of FIG. 9A where the dispenser is actuated and configured to dispense liquid ingredient.

FIG. 9B shows the liquid ingredient dispenser 900 in an actuated state where the button 912 is depressed and the plunger 930 is moved downward such that the plunger 930 may disengage from a distal portion 934 of the inner receptacle 922, thereby permitting liquid ingredient to dispense into a sloped measuring chamber 932. As shown in FIGS. 9A-D, a base of the inner receptacle 922 may be sloped to urge liquid ingredient into the measuring chamber 932. The measuring chamber 932 may include any suitable number of volume markings as shown in FIGS. 9A-B to indicate a measurement of the accumulated liquid ingredient.

Figure 9C:
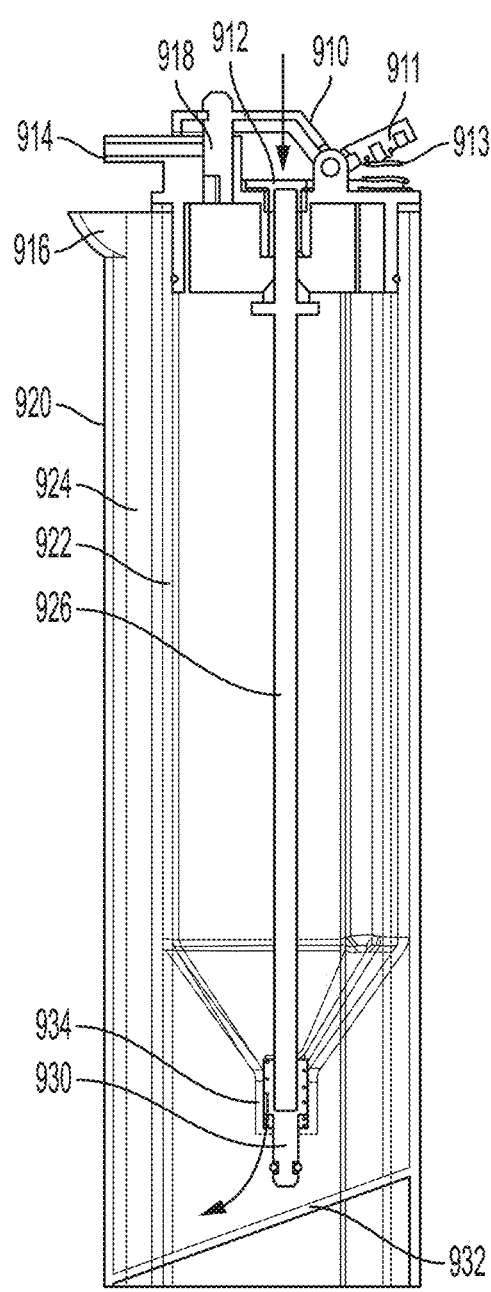
FIG. 9C is a cross-section view of the liquid ingredient dispenser of FIG. 9A taken along line 9C-9C of FIG. 9A, where the dispenser is actuated and configured to dispense liquid ingredient.

FIG. 9C shows a cross-section view of the dispenser 900 of FIG. 9A taken along line 9C-9C where the button 912 is shown in a depressed configuration such that liquid ingredient may be dispensed into the measuring chamber 932. Once a desired amount of liquid ingredient is accumulated in the measuring chamber, a user may release the button 912 to move the plunger 930 upwards and into engagement with the distal portion 934 of the inner receptacle 922 to prevent further flow of liquid ingredient into the measuring chamber 932. A user may then dispense the accumulated liquid ingredient by tilting the dispenser 900 such that the liquid ingredient goes through a passage 924 located between the inner receptacle 922 and the outer receptacle 900 and then out of the outer spout 916.

Figure 9D:
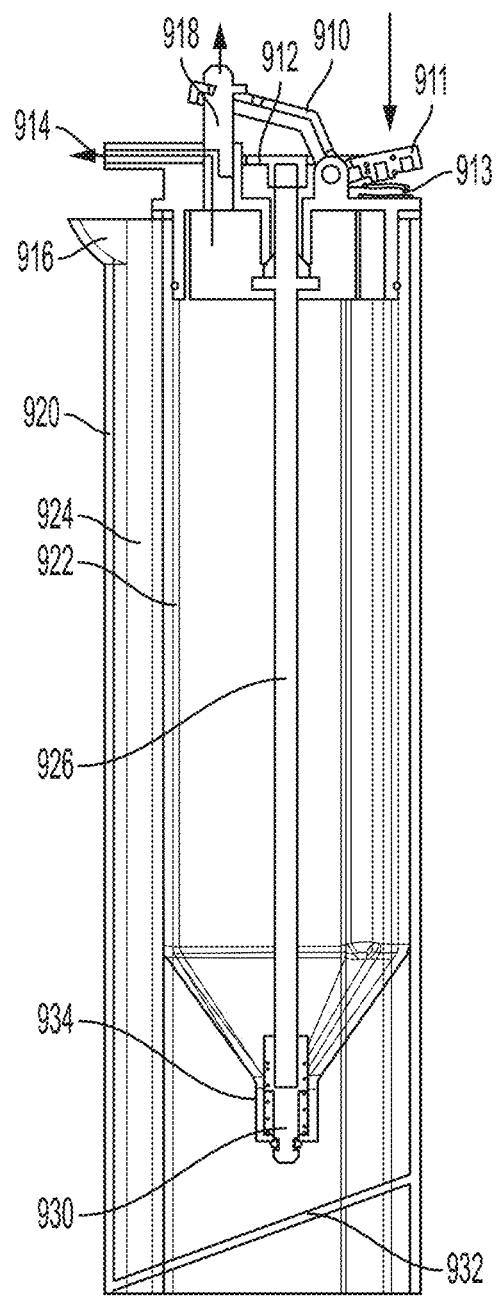
FIG. 9D shows the arrangement of FIG. 9C, where the dispenser is in a free-flow mode.

FIG. 9D shows the arrangement of FIG. 9C where the button 912 is shown in a non-actuated state while the lever 910 is shown in an actuated state. That is, a first portion 911 of the lever 910 is depressed such that a stopper 918 is moved upward to permit flow of liquid ingredient out of a free-flow spout 914. When it is desirable to close the free-flow spout, a user may flip the first portion 911 of the lever 910 upward to move the stopper 918 downwards to close the passage to the free-flow spout 914. As used herein, the configuration in which the first portion of the lever is depressed is referred to as the open lever configuration while the configuration in which the first portion of the lever is flipped upwards is referred to as the closed lever configuration. In some embodiments, the first portion 911 of the lever 910 may be angled (e.g., as shown in FIGS. 9A-D) or straight relative to the remainder of the lever 910 as the disclosure is not so limited.

In some embodiments, the lever 910 may retain its position once the first portion 911 is depressed or flipped upwards by the user without the user actively engaging the lever 910. In some embodiments, a biasing member 913 may be employed with the lever 910 to urge the lever towards to return to its original position. For example, in some embodiments, once a user removed a depression force on the lever, a biasing member 913 may urge the first portion 911 of the lever 910 upwards such that the stopper 918 moves downward to prevent flow of liquid ingredient out of the free-flow spout 914. Alternatively, a biasing member may urge the lever downwards (e.g., into the lever position shown in FIG. 9D) such that a user must actively be pressing the first portion of the lever upwards to move the stopper 918 downwards to prevent flow from free-flow spout 914.

In some embodiments, the liquid ingredient dispensers may only include a single spout instead of both free-flow spouts and outer spouts as described in relation to FIGS. 8A-D and 9A-D For example, in some embodiments there may be an opening along a wall of the inner receptacle providing a flow path between the inner receptacle and the passage (e.g., 824, 924). In some such embodiments, only an outer spout (e.g., 812, 916) may be provided and the dispenser may permit both free-flow dispensing and measured dispensing of the liquid ingredient via the outer spout. In some embodiments, a valve may also be included in such an opening provided along a wall of the inner receptacle to regulate flow of liquid ingredient into the passage and out of the outer spout. While this example is provided, a valve of any suitable type may be included with the dispenser to regulate flow of liquid ingredient from the inner receptacle, passage, outer spout and/or the free-flow spout as the disclosure is not so limited.

Figure 10A:
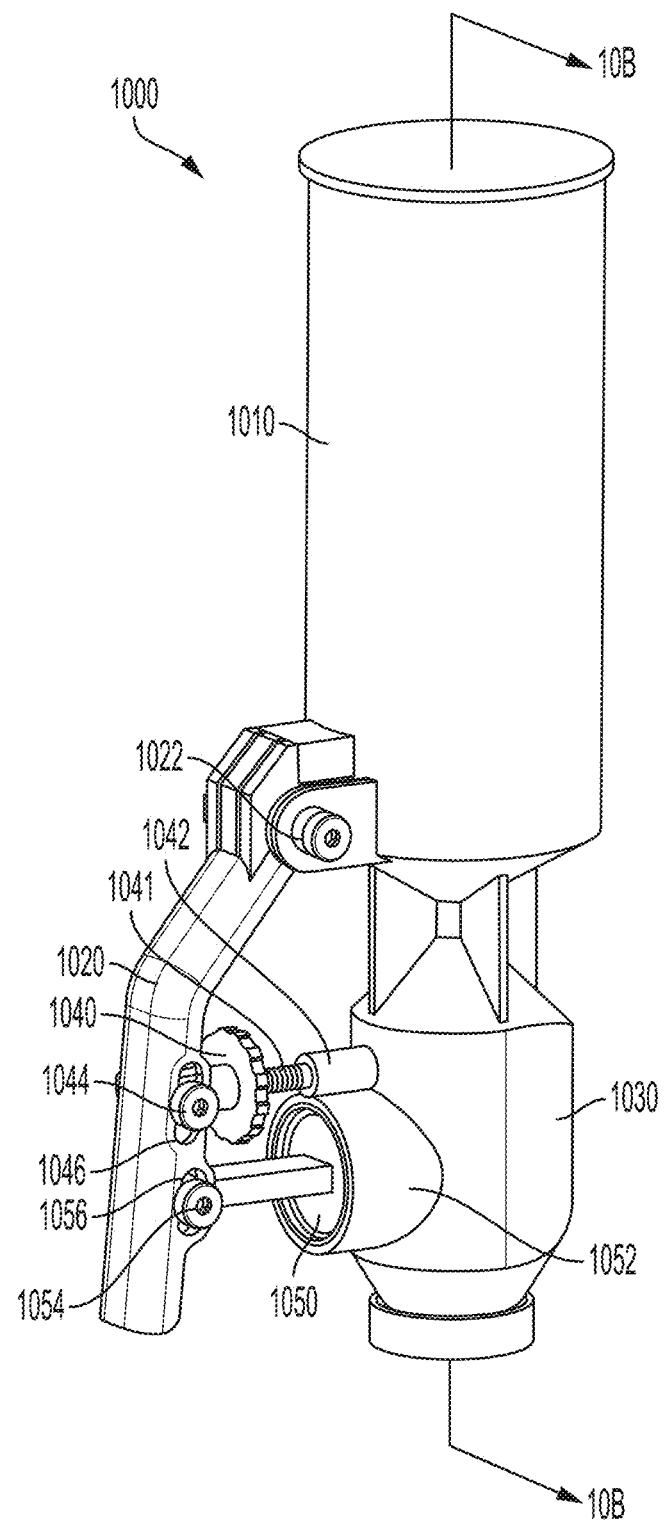
FIG. 10A is a perspective view of a liquid ingredient dispenser, according to another embodiment.
Figure 10B:
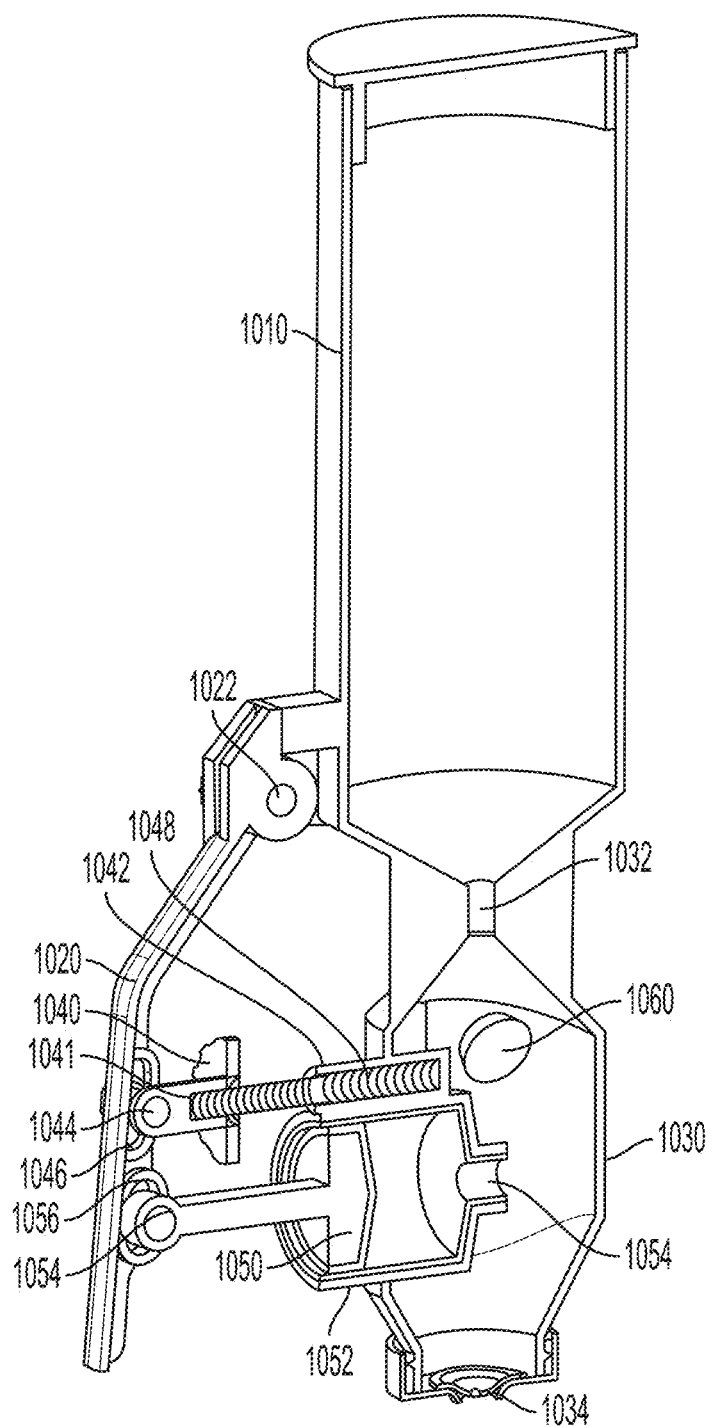
FIG. 10B is a cross-section view of FIG. 10A taken along line 10B-10B of FIG. 10A, where the dispenser is shown in a non-actuated state.
Figure 10C:
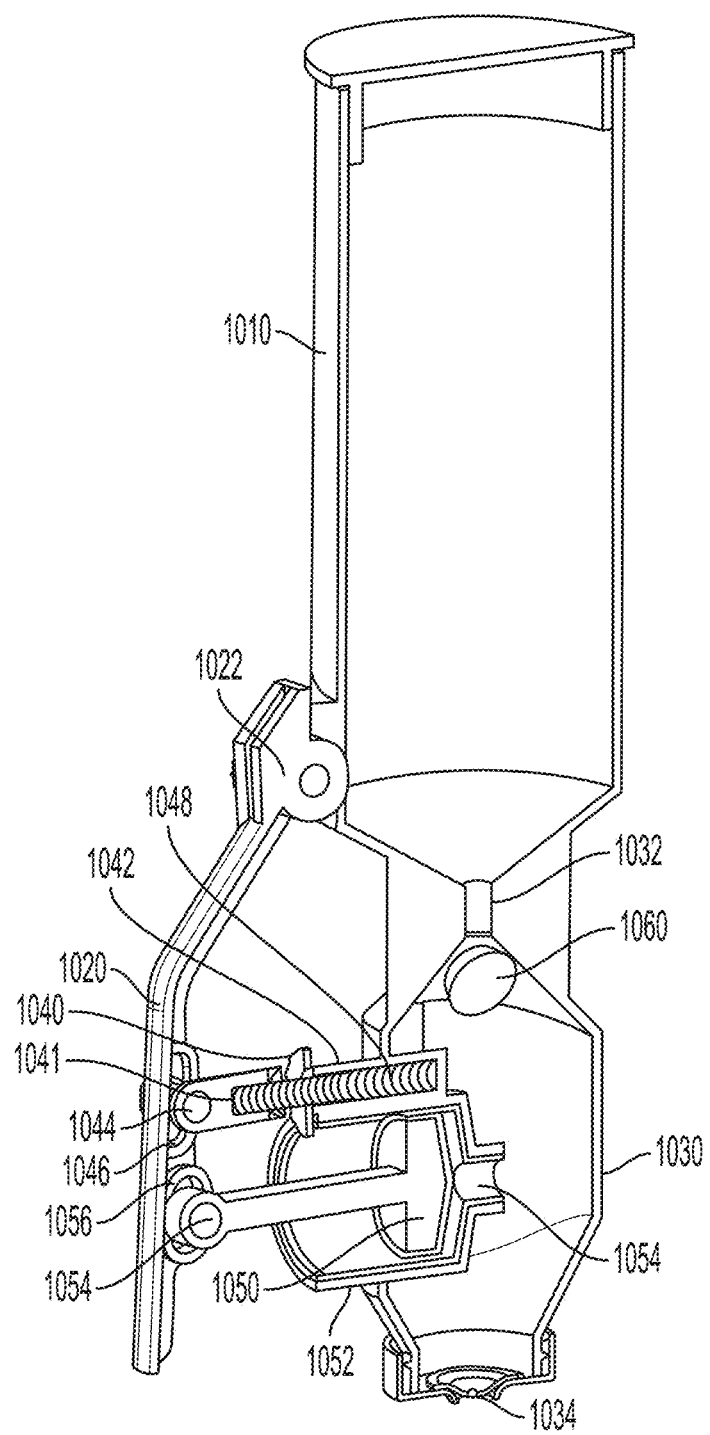
FIG. 10C shows the arrangement of FIG. 10B, where the dispenser is actuated and configured to dispense liquid ingredient.

FIG. 10A shows a perspective view of a liquid ingredient dispenser 1000 including a receptacle 1010, a handle 1020, and a measuring chamber 1030. The handle 1020 may be rotatably connected to the receptacle 1010 at pivot point 1022 to permit movement of the handle 1020 between an actuated state and a non-actuated state. The dispenser 1000 may include a volume adjustment knob 1040 and a plunger 1050 which may both be coupled to the handle 1020 such that movement of the handle moves each of the adjustment knob and plunger. In particular, as shown in FIGS. 10A-C, the handle 1020 may include slots 1046 and 1056 which are configured to receive pinned connection 1044 of the volume adjustment knob 140 and pinned connection 1054 of the plunger 1050, respectively. The measuring chamber 1030 may include a tube 1042 and a conduit 1050 extending outwardly therefrom. The volume adjustment knob 1040 may be engageable with the corresponding tube 1042 such that the volume adjustment knob 1040 may be advanced or retracted from the tube 1042 to increase or decrease a travel path distance of a plunger 1050, respectively. That is, in some embodiments, the volume adjustment knob 1040 may be rotated or translated towards to the tube 1042 such that a depth in which a pin 1041 may be inserted into the tube 1042 once the handle 1020 is depressed is reduced (e.g., due to the volume adjustment knob 1040 abutting the tube 1042 earlier). Alternatively, in some embodiments the volume adjustment knob 1040 may be rotated or translated away from the tube 1042 such that a depth in which a pin 1041 may be inserted into the tube 1042 is increased. Accordingly, the position of the volume adjustment knob 1040 may be suitably adjusted to adjust the corresponding travel path of the plunger 1050 .... The plunger 1050 may be engageable with the conduit 1052 such that actuation of the handle 1020 may advance or retract the plunger 1050 from the conduit 1052. In some embodiments, the plunger 1050 may form a seal with an inner wall of the conduit 1052 to prevent inadvertent leakage of liquid ingredient from the conduit 1052.

FIG. 10B shows a cross-section view the dispenser 1000 of FIG. 10A taken along line 10B-10B, where the dispenser 1000 is shown in a non-actuated state. The measuring chamber 1030 may include a floater valve 1060 disposed therein which is configured to float within the measuring chamber volume in the non-actuated state of the dispenser. The dispenser 1000 further includes an intake 1032 extending between the receptacle 1010 and the measuring chamber 1030. In the non-actuated state, liquid ingredient stored in the receptacle 1010 is able to freely flow into the measuring chamber 1030 until it is filled because the intake 1032 is not blocked by the floater valve 1060. The measuring chamber 1030 may also include a valve 1034 located at the distal end that is configured to open to permit dispensing of the liquid ingredient when the dispenser 1000 is in the actuated state. As can be seen in FIG. 10B, the tube 1042 may include a biasing member 1048 disposed therein which may be configured to urge the pin 1041 and in turn the handle 1042 to return to its original position once the user stops depressing the handle 1020.

FIG. 10C shows the arrangement of FIG. 10B where the dispenser is instead shown in the actuated state. In this state, the user may depress the handle 1020 inwards such that the plunger 1050 advances through passageway 1052 towards opening 1054. The motion of the plunger 1050 causes an increased pressure in the liquid contained in the measuring chamber 1030, thereby causing the floater valve 1060 to block the intake 1032 to prevent further flow of liquid ingredient into the measuring chamber 1030. In addition, the motion of the plunger 1050 inwards causes accumulated liquid ingredient within the measuring chamber 1030 to be dispensed from the valve 1034. Upon dispensing the liquid ingredient, the user may remove the force applied to the handle 1020 which in turn retracts the plunger 1050 from the passageway 1052, thereby removing the excess pressure and allowing the floater valve 1060 to return to its original position so that it no longer blocks the intake 1032.

In some embodiments, any suitable valve may be employed at the distal end of the measuring chamber to permit dispensing of the liquid ingredient. In particular, the inventors have recognized that certain valves may be beneficial to use depending on the viscosity of the liquid ingredient. For example, a cross-slit valve may be employed for more viscous liquid ingredients.

In some embodiments, movement of the floater valve within the measuring chamber may be constrained along a particular travel path. For example, the floater valve may be disposed within tubing extending from the intake 1032 such that the floater valve is constrained to move vertically within the tubing.

In some embodiments, the measuring chamber 1030 may include any suitable number of volume markings to indicate a measurement of the accumulated liquid ingredient in the measuring chamber. In some embodiments, the measuring chamber may be transparent or translucent so that the user may view the contents of the measuring chamber.

Figure 11A:
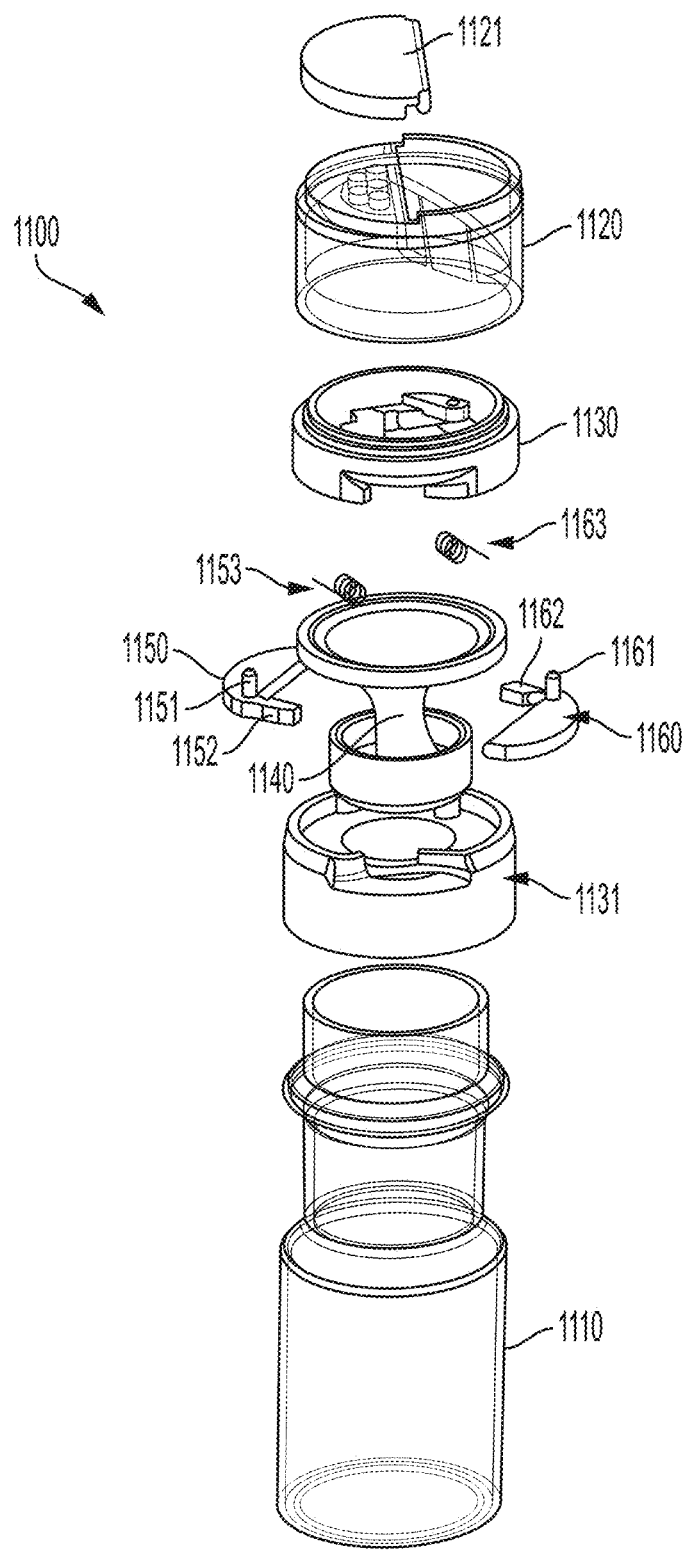
FIG. 11A is a perspective exploded view of a dry ingredient dispenser, according to another embodiment.
Figure 11B:
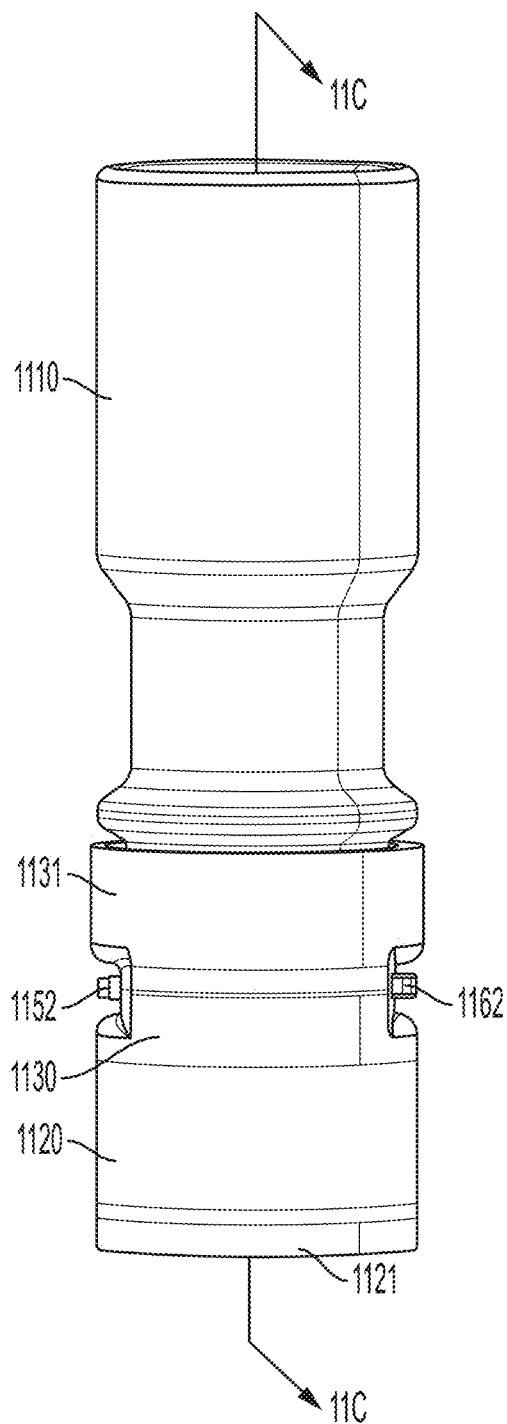
FIG. 11B is a perspective view of the dry ingredient dispenser of FIG. 11A when assembled, according to some embodiments.

FIG. 11A shows a perspective exploded view of a dry ingredient dispenser 1100 including a receptacle 1110 and a measuring chamber 1120. The dispenser 1100 also includes a top housing 1130 and a bottom housing 1131 which each flank respective ends of a valve 1140. The bottom housing 1131 may be engaged with the receptacle 1110 while the top housing 1130 may be engaged with the measuring chamber 1120. The receptacle and bottom housing as well as the measuring chamber and the top housing may be engaged to one another by any suitable form of attachment including a friction fit, threaded fit, or any other suitable fit as the disclosure is not so limited. The dispenser may also include a lid 1121 coupled to the measuring chamber 1120, where the lid 1121 can be opened and closed to permit or restrict dispensing of dry ingredient from the measuring chamber 1120, respectively. The dispenser may also include one or more levers 1150, 1160 configured to be actuated by a user to close an opening of the valve 1140, thereby restricting dry ingredient from being dispensed between the receptacle 1110 and measuring chamber 1120. That is, absent actuation of the levers 1150, 1160 by the user, the valve 1140 may remain open to permit dispensing of the dry ingredient. The levers 1150, 1160 each include pins 1151, 1161 and protuberances 1152, 1162. The pins 1151, 1161 may be received within the top housing 1130 to secure the levers 1150, 1160 in a desired position relative to the valve. In some embodiments, torsion springs 1153, 1163 may be operatively coupled to levers 1150, 1160 such that the springs may be configured to return the levers 1150, 1160 to a non-actuated position when a force to actuate the levers is released by the user. The protuberances 1152, 1162 may extend out of the side of the top housing 1130 and/or bottom housing 1131 when the dispenser is assembled as shown in FIGS. 11B and 11D such that the user can depress the protuberances to actuate the respective levers to close the valve 1140 once a desired amount of dry ingredient has been dispensed into the measuring chamber 1120. In the embodiments of FIGS. 11A-E, the region defined by the top housing 1130, the bottom housing 1131, the valve 1140, the levers 1150, 1160, and the springs 1153, 1163 may be collectively referred to as the "actuating portion" according to embodiments disclosed herein.

FIG. 11B shows a perspective view of the dry ingredient dispenser of FIG. 11A in an assembled state. As shown in FIG. 11B, the protuberances 1152, 1162 of the levers may extend out of the space formed by the top housing 1130 and bottom housing 1131 such that the user can move the levers into engagement with the valve when desired.

Figure 11C:
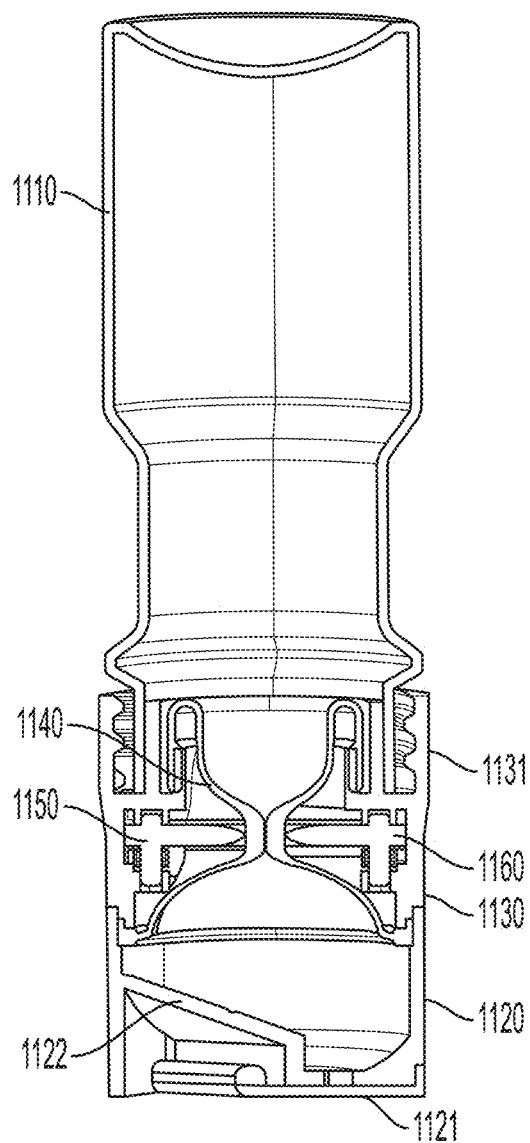
FIG. 11C is a cross-section view of the dry ingredient dispenser of FIG. 11B taken along line 11C-11C, where a valve of the dispenser is in a closed position.
Figure 11D:
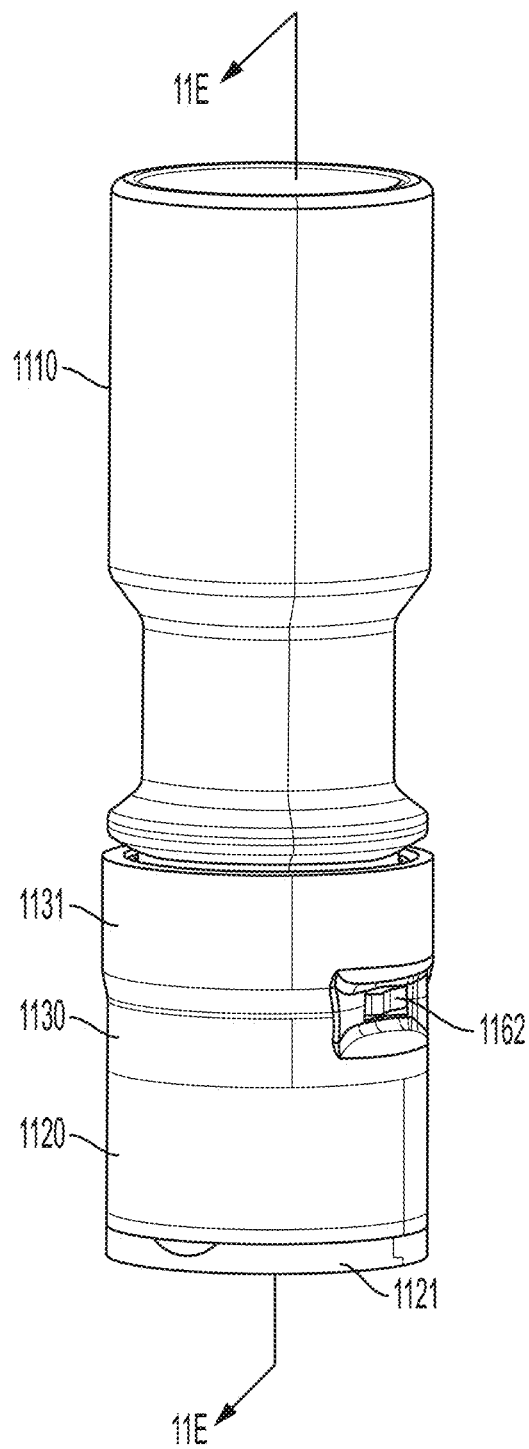
FIG. 11D is a perspective view of the dry ingredient dispenser of FIG. 11A when assembled, according to some embodiments.

FIG. 11C shows a cross-section view of the dry ingredient dispenser of FIG. 11B taken along line 11C-11C. As shown in FIG. 11C, the valve 1140 of the dispenser is in a closed configuration due to the user depressing protuberances 1152, 1162 of levers 1150, 1160, which may cause the levers to swing inwardly and compress the midsection of the valve 1140.

Figure 11E:
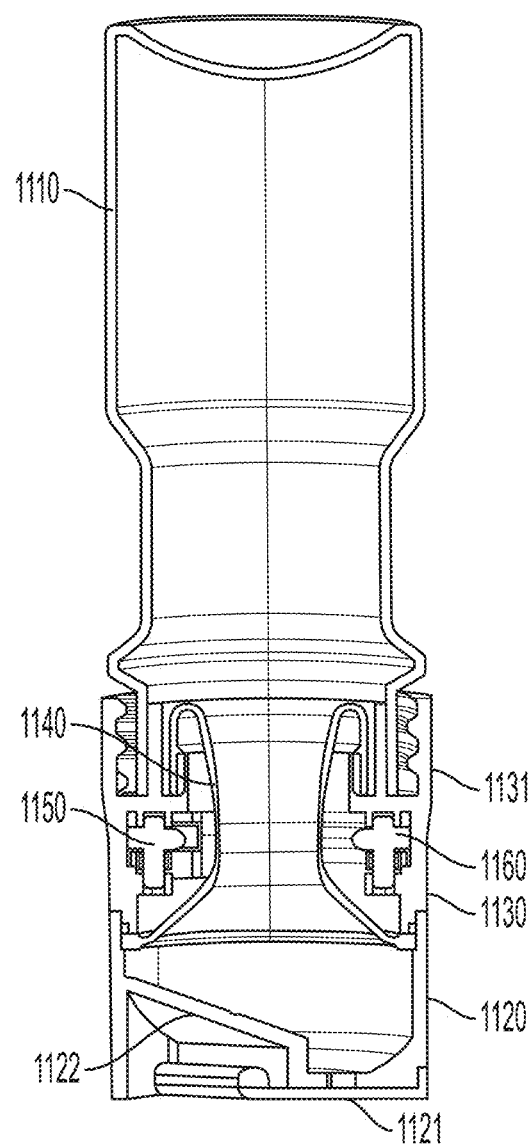
FIG. 11E is a cross-section view of FIG. 11D taken along line 11E-11E, where a valve of the dispenser is in an open position.

FIG. 11D shows a perspective view of the dry ingredient dispenser of FIG. 11A in an assembled state, where the protuberances 1152 (not shown) and 1162 are not actuated by the user such that the valve 1140 is in an open configuration as shown in FIG. 11E.

FIG. 11E shows a cross-section view of FIG. 11D taken along line 11E-11E. In the open configuration shown in FIG. 11E, dry ingredient may be configured to flow from the receptacle 1110 through the valve 1140 and into the measuring chamber 1120. As disclosed herein, a measuring chamber may include any a variety of suitable measurement features including a ramp 1122, or any other suitable feature as the disclosure is not so limited. While FIGS. 11A-11E have shown an arrangement where the valve is in an open configuration by default (i.e., absent actuation of the levers 1150, 1160), in some embodiments, the valve 1140 may be in the closed configuration by default due to the levers 1150, 1160 being biased into engagement with the valve 1140 absent user actuation. In some such embodiments, the user may open the valve by actuating the levers to swing outwardly and away from the valve to remove compression on the valve. Additionally, while levers are shown in the embodiments of FIGS. 11A-11E, any suitable type of actuator may be used, e.g., a depressible plunger or button, etc.

Figure 12A:
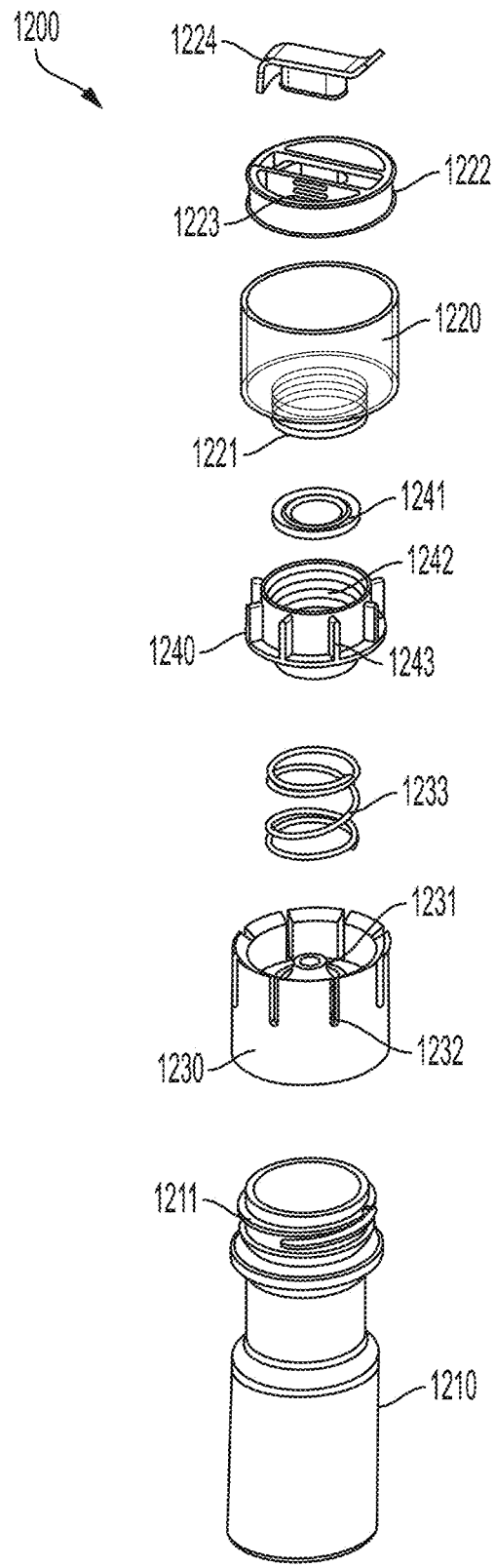
FIG. 12A is a perspective exploded view of a dry ingredient dispenser, according to another embodiment.

FIG. 12A shows a perspective exploded view of a dry ingredient dispenser 1200 including a receptacle 1210, a measuring chamber 1220, a funnel housing 1230, and a valve retainer 1240. The receptacle 1210 may include externally threaded features 1211 configured to engage internal threading on the funnel housing 1230. Likewise, the measuring chamber 1120 may include externally threaded features 1221 configured to engage internal threading 1242 on the valve retainer 1240. The valve retainer 1240 may also include ribs 1243 configured to be received within recesses 1232 of the funnel housing 1230 such that the valve retainer is secured in a desired position relative to the funnel housing when assembled. The funnel housing may include a funnel 1231 extending therefrom, where the funnel may be configured to engage a valve 1241 located in the valve retainer 1240 as shown in FIG. 12C. That is, the user may push on an end of the receptacle 1210 which extends the funnel 1231 into the valve 1241 such that dry ingredient is permitted to be dispensed to the measuring chamber 1220. A coil spring 1233 may be received around the funnel 1231 and/or an end of the valve retainer 1240 such that once the user removes the force on the receptacle, the funnel 1231 may be retracted from the valve 1241, thus restricting the flow of dry ingredient through the valve and into the measuring chamber. In the embodiments of FIGS. 12A-E, the region defined by the funnel housing 1230, the valve retainer 1240, the valve 1241, and the spring 1233 may be collectively referred to as the "actuating portion" according to embodiments disclosed herein.

In some embodiments, a lid 1222 may be received within an interior volume of the measuring chamber 1220. In some embodiments, the lid may be flexible (e.g., made of silicone) such that it may conform to the interior wall of the measuring chamber and optionally form a seal with the measuring chamber. In some embodiments, the lid 1222 may be adjustable in its position relative to the height of the measuring chamber 1220. For example, the lid 1222 may include one or more gripping surfaces 1223 that the user may grip, and the user may move the lid 1222 up or down within the measuring chamber to adjust a measurement volume of the chamber. In some embodiments, the lid 1222 may also include a flip top portion that the user may open to permit dry ingredient to be dispensed from the measuring chamber 1220.

Figure 12B:
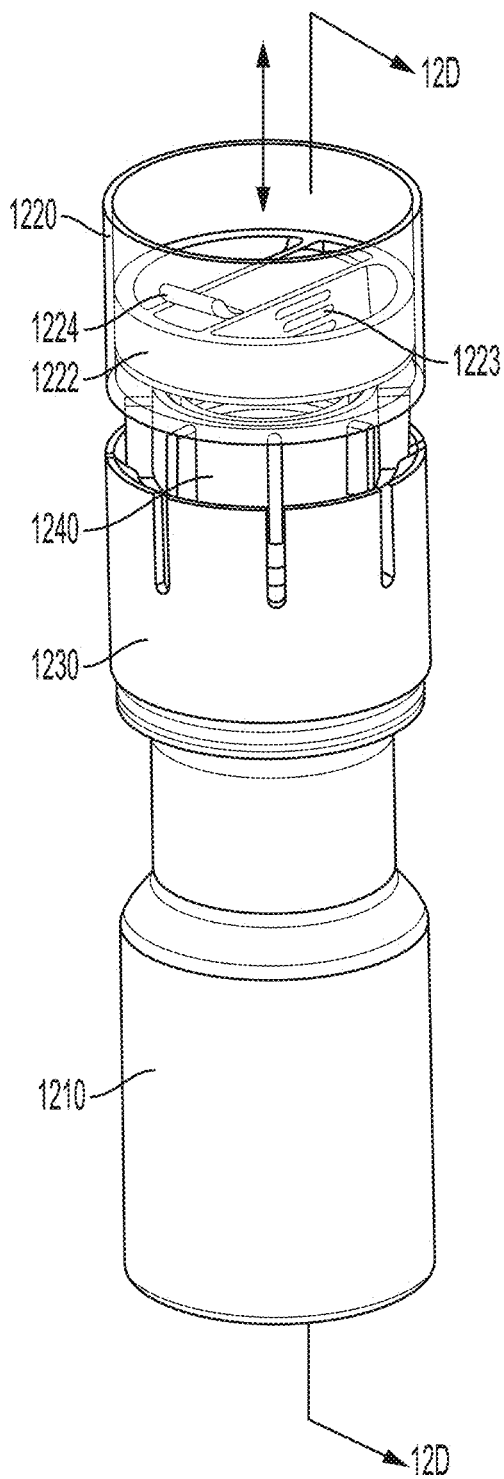
FIG. 12B is a perspective view of the dry ingredient dispenser of FIG. 12A when assembled, according to some embodiments.
Figure 12C:
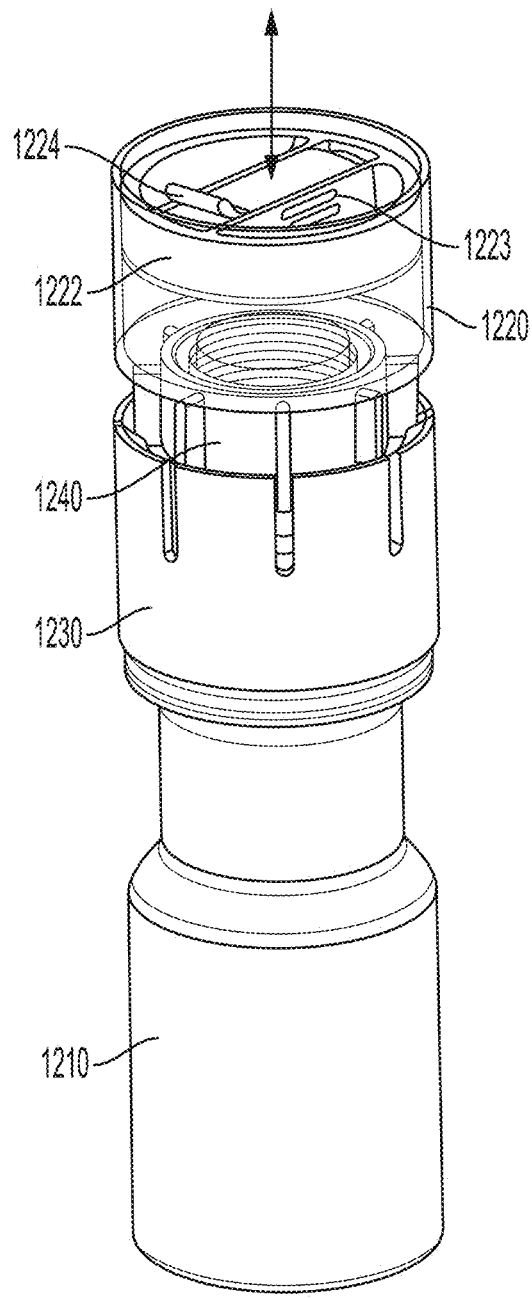
FIG. 12C is a perspective view of the dry ingredient dispenser of FIG. 12B, where a size of the measuring chamber has been adjusted, according to some embodiments.

FIGS. 12B-12C shows perspective views of the dry ingredient dispenser of FIG. 12A in an assembled state, where the measurement volume of the measuring chamber is shown to be adjustable by moving the lid 1222 relative to the measuring chamber 1220. In particular, FIG. 12B shows an embodiment where the measurement volume has been reduced by moving the lid 1222 downwards while FIG. 12C shows an embodiment where the measurement volume has been increased by moving the lid 1222 upwards. In some embodiments, the measuring chamber 1220 may be transparent and/or include one or more measurement markings (not shown) configured to provide an indication to the user as to which height of the lid corresponds to a certain measurement volume.

Figure 12D:
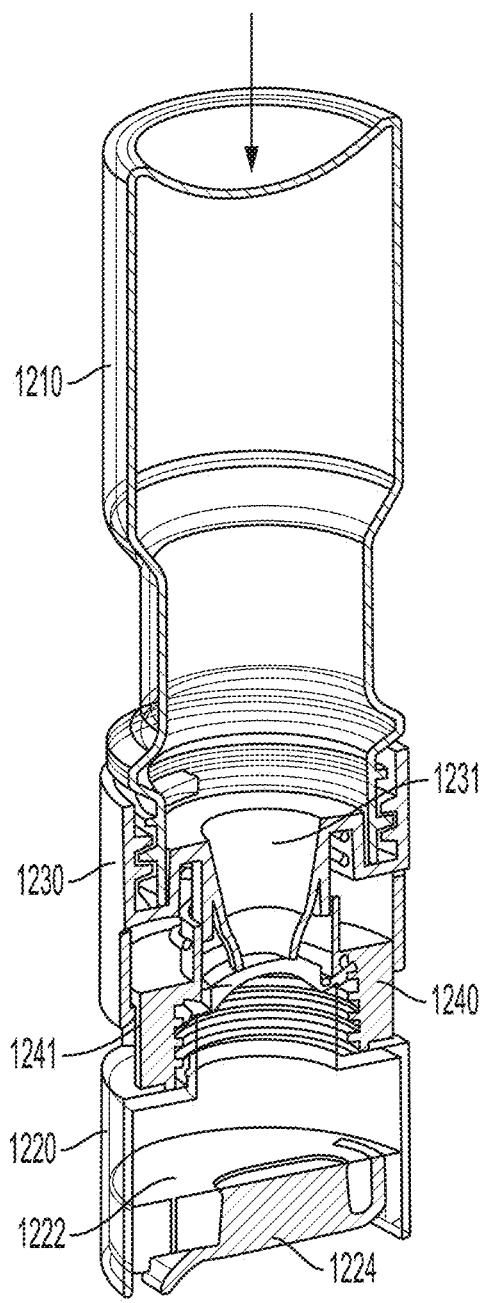
FIG. 12D is a cross-section view of FIG. 12B taken along line 12D-12D, where the dispenser is in a non-actuated state.
Figure 12E:
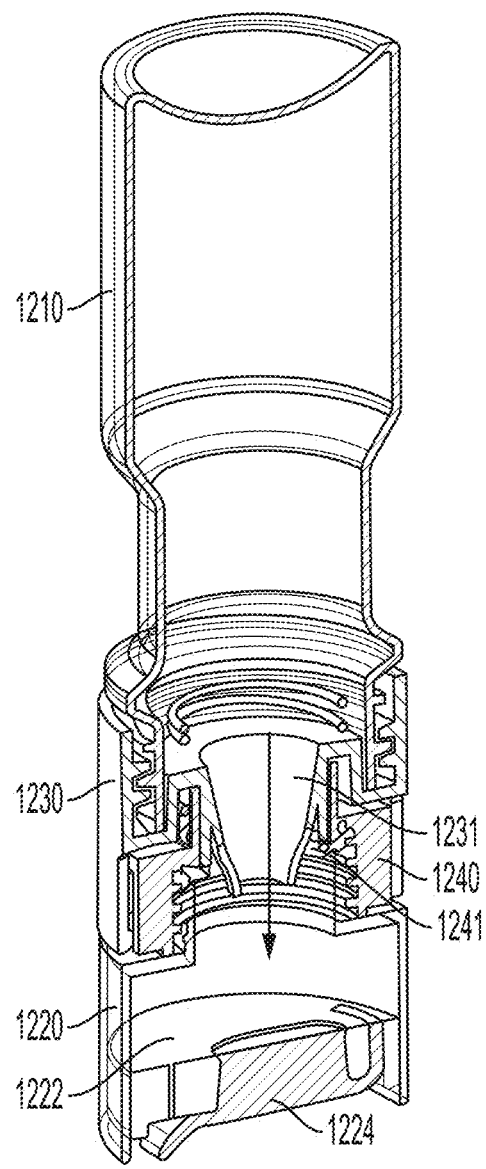
FIG. 12E is a cross-section view of FIG. 12B taken along line 12D-12D, where the dispenser is in an actuated state and configured to dispense ingredient.

FIG. 12D shows a cross-section view of FIG. 12B taken along line 12D-12D, where the dispenser is in a non-actuated state. In particular, the funnel 1231 is shown to be positioned above the valve 1241 which remains in the closed configuration such that dry ingredient is restricted from entering the measuring chamber 1220. In contrast, FIG. 12E shows a cross-section view of FIG. 12B taken along line 12D-12D but shows the dispenser in an actuated state. That is, the user may push down on the receptacle 1210 to in turn move funnel housing 1230 and funnel 1231 downwards, which allows the funnel 1231 to move through the valve 1241 and permits dry ingredient to flow between the receptacle 1210 and measuring chamber 1220. The valve 1241 may be of any suitable type including, but not limited to a cross-slit valve as disclosed herein. The valve may also be elastically deformable such that following removal of the funnel 1231 from the valve 1241, the valve may return to its original position and restrict flow of dry ingredient.

According to the embodiments of a dry ingredient dispenser disclosed herein, a dry ingredient dispenser may generally include a receptacle, an actuating portion, and a measuring chamber. While a variety of suitable types of actuating portions and measuring chambers have been discussed, in some embodiments, any of the actuating portions and measuring chambers disclosed herein may be interchanged with one another. That is, the user may disengage a first actuating portion from the receptacle and then engage a second actuating portion onto the receptacle. For example, the actuating portion 120 of FIG. 1A may be disengaged from receptacle 110, and then the actuating portion 320 of FIG. 3A which includes a grinder may be engaged to the receptacle. Similarly, the user may disengage a first measuring chamber from the actuating portion, and then engage a second measuring chamber onto the actuating portion. For example, the measuring chamber 130 of FIG. 1A may be disengaged from actuating portion 120, and then measuring chamber 1120 of FIG. 11A may be engaged onto the actuating portion. While such examples are disclosed above, the actuating portions and measuring chambers of dry ingredient dispensers disclosed herein may be interchanged in any suitable fashion as the disclosure is not so limited.

Figure 13A:
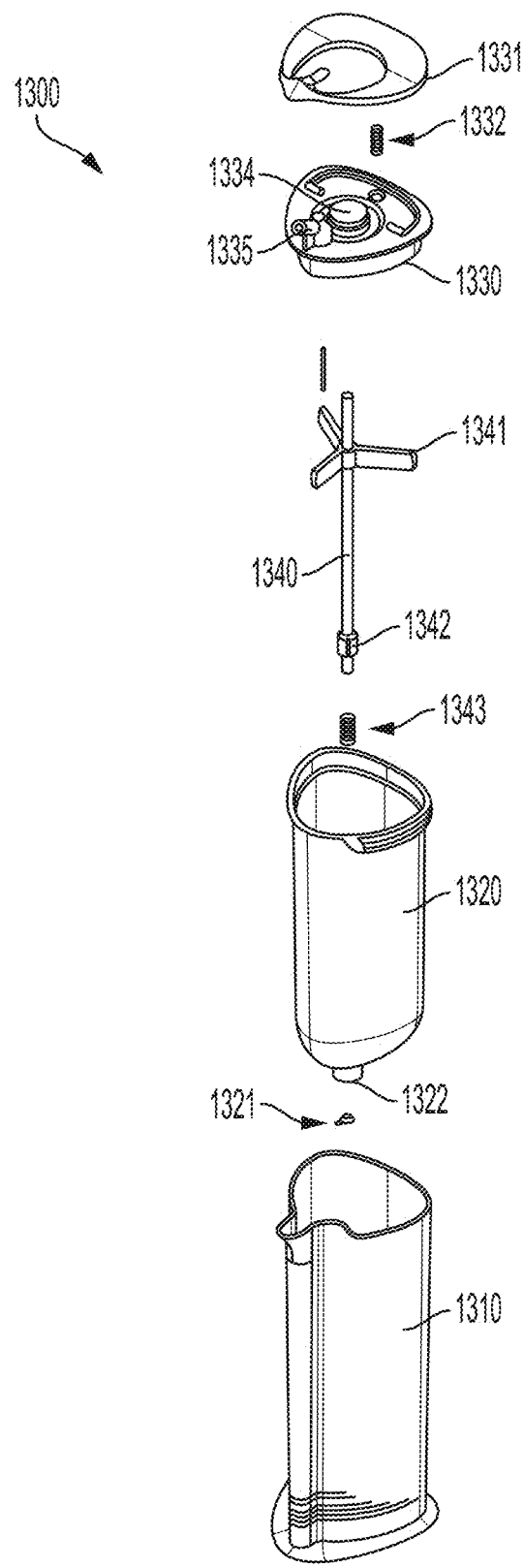
FIG. 13A is a perspective exploded view of a liquid ingredient dispenser, according to another embodiment.

FIG. 13A shows a perspective exploded view of a liquid ingredient dispenser 1300 including an outer receptacle 1310, an inner receptacle 1320, and a lid 1330. The inner receptacle 1220 may be positioned with the outer receptacle 1220, and the lid 1330 may be engaged with a top portion of the inner receptacle 1320. A shaft 1340 having one or more vanes 1341 and a plunger 1342 may be positioned within the inner receptacle 1320, where the one or more vanes may serve to maintain the shaft 1340 in a desired position within the receptacle. While three vanes are shown in FIG. 13A, any suitable number, size, and/or shape of vanes may be used to provide stability to the shaft 1340 as the disclosure is not so limited. The plunger 1342 may form a seal with a distal portion 1322 of the receptacle 1320 when assembled to prevent fluid communication between the inner receptacle 1320 and the outer receptacle 1310. That is, the plunger 1342 may restrict fluid flow out of distal portion 1322 when the plunger is in a retracted configuration (shown in FIG. 13C) but may permit fluid flow out of the distal portion 1322 when the plunger 1342 is in the extended configuration. For example, a button 1344 may be depressed by a user which in turn may move the plunger 1342 downwards relative to the distal portion 1322 to permit fluid flow. In some embodiments, the plunger 1342 may include an O-ring 1321 which may assist the plunger in forming a seal in the retracted configuration with the distal portion 1322. In some embodiments, the plunger 1342 may also contact a spring 1343 which may bias the plunger 1342 to the retracted configuration absent a force input by the user to the button 1334.

Figure 13B:
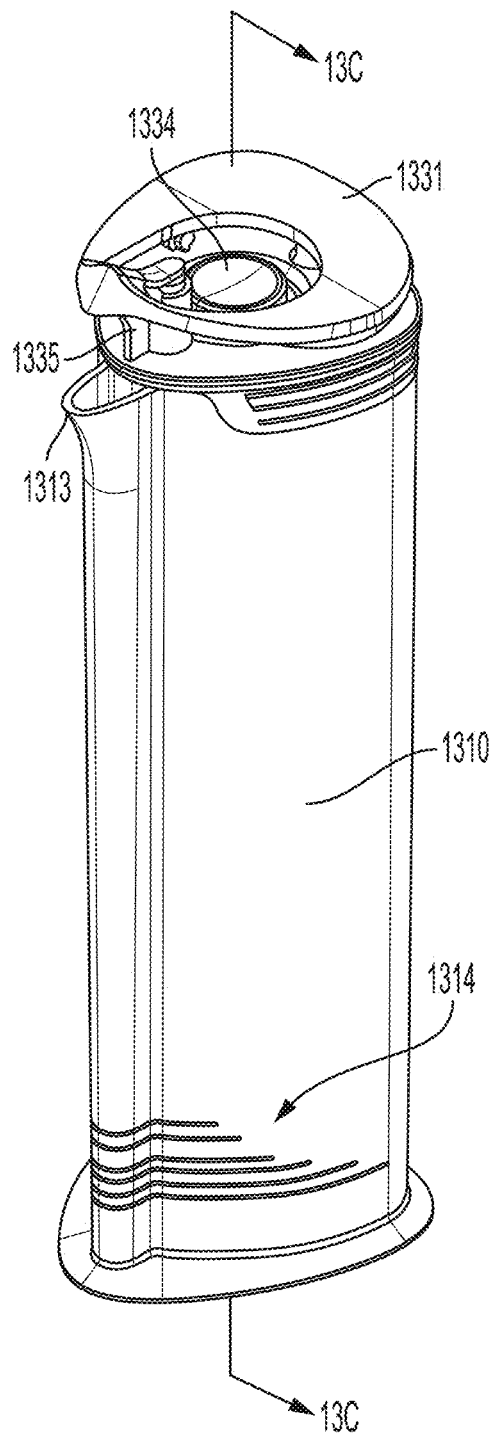
FIG. 13B is a perspective view of the liquid ingredient dispenser of FIG. 13A when assembled, according to some embodiments.
Figure 13C:
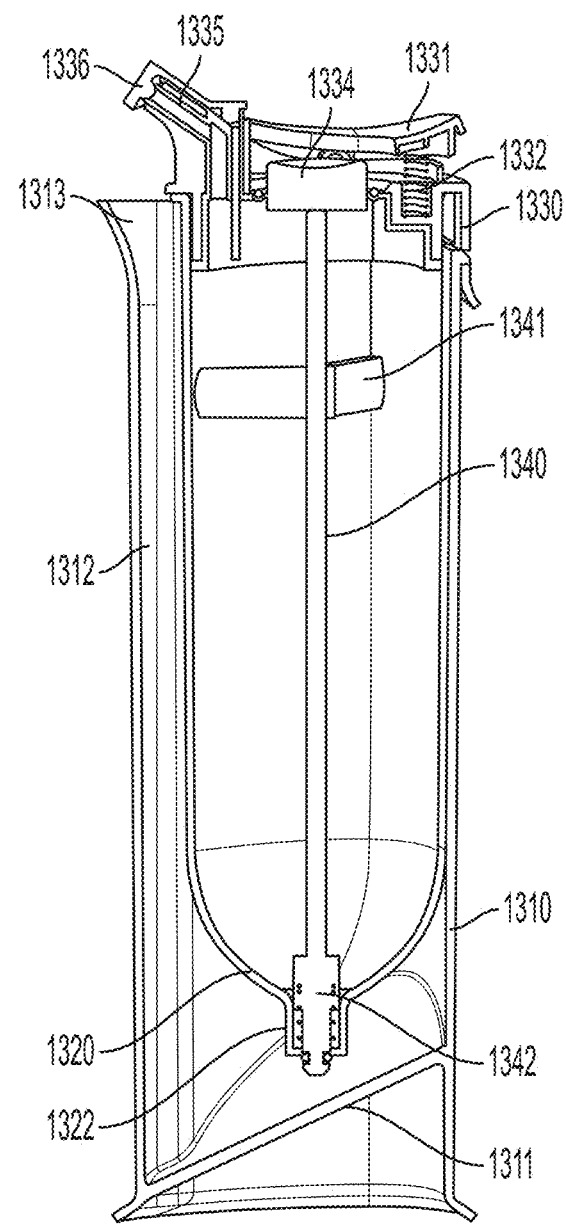
FIG. 13C is a cross-section view of the liquid ingredient dispenser of FIG. 13B taken along line 13C-13C.

FIG. 13B shows a perspective view of the liquid ingredient dispenser of FIG. 13A in an assembled state while FIG. 13C shows a cross-section view of the liquid ingredient dispenser of FIG. 13B taken along line 13C-13C. As shown in FIGS. 13B-13C, the liquid ingredient dispenser may include an outer spout 1313 configured to dispense liquid ingredient which accumulates in the outer receptacle 1310. That is, the user may actuate the plunger 1342 via button 1334 to move the plunger from the retracted position shown in FIG. 13C to the extended position (not shown) such that liquid ingredient stored in the inner receptacle 1320 may be dispensed into the outer receptacle 1310. The user may then tilt the dispenser to allow for the accumulated liquid ingredient to flow through passage 1312 and out of outer spout 1313. This arrangement is referred to as a "measured dispense" mode. In some embodiments, the outer receptacle 1310 may include a ramp portion 1311, measurement markings 1314, or any other suitable measurement features as disclosed herein to provide an indication to the user of the accumulated amount of liquid ingredient.

In addition, the arrangement of FIGS. 13A-13C may include a "free dispense" mode. The dispenser 1300 may include a lid 1330 and a flip top 1331 engaged with the lid 1330 via a spring 1332. In operation, the user may press down on a proximal side of the flip top 1331 (i.e., the side closer to the spring 1332) to remove a distal portion 1336 of the lid from engagement with an opening a free-flow spout 1335. Thus, once the opening of spout 1335 is exposed, the user may freely dispense liquid ingredient from the inner receptacle 1320 via the spout 1335. Once the user removes a force applied to the flip top 1331, the spring 1332 may bias the flip top to re-engage with the spout 1335 to restrict fluid flow.

The embodiments described herein may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An ingredient dispenser for dispensing a measured amount of liquid ingredient, the ingredient dispenser comprising:
    a receptacle configured to contain liquid ingredient;
    a button configured to actuate a plunger between an open position and a closed position, wherein in the open position the plunger is configured to permit flow of the liquid ingredient from the receptacle, and wherein in the closed position the plunger is configured to prevent flow of the liquid ingredient from the receptacle;
    a measuring chamber including one or more measurement indicators configured to indicate a measurement volume, wherein the measuring chamber is configured to receive the flow of the liquid ingredient from the receptacle;
    one or more spouts, wherein the one or more spouts are configured to direct flow of the liquid ingredient from at least one of the measuring chamber or the receptacle;
    wherein the one or more spouts include a free-flow spout configured to dispense the liquid ingredient from the receptacle; and,
    a stopper configured to prevent flow of the liquid ingredient from the free-flow spout, and further comprising a lever configured to actuate the stopper between a closed position in which flow of the liquid ingredient from the free-flow spout is prevented and an open position in which flow of the liquid ingredient from the free-flow spout is permitted, wherein the lever is adjacent the button.

2. The ingredient dispenser of claim 1, wherein the receptacle is an inner receptacle and further comprising an outer receptacle extending at least partially around the inner receptacle.

3. The ingredient dispenser of claim 2, wherein a gap between the inner receptacle and the outer receptacle forms a passage in fluidic connection with the measuring chamber, wherein the free-flow spout is a first spout, and wherein the one or more spouts includes a second spout located along the passage configured to dispense the liquid ingredient from the measuring chamber.

4. The ingredient dispenser of claim 1, wherein the one or more measurement indicators include one or more volume markings located on the measuring chamber configured to indicate a numeric value associated with the measurement volume of the measuring chamber.

5. The ingredient dispenser of claim 1, further comprising one or more vanes attached to a shaft of the plunger.

6. The ingredient dispenser of claim 1, further comprising a biasing element operatively coupled with the plunger, wherein the biasing element is configured to move the plunger to the closed position in the absence of a force applied from a user to the button.

\* \* \* \* \*